US006978061B1

(12) United States Patent
Tabuchi

(10) Patent No.: US 6,978,061 B1
(45) Date of Patent: Dec. 20, 2005

(54) OPTICAL SWITCHING DEVICE

(75) Inventor: Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/033,738

(22) Filed: Jan. 13, 2005

(30) Foreign Application Priority Data

Oct. 8, 2004 (JP) .............................. 2004-296846

(51) Int. Cl.[7] .............................................. G02B 6/42
(52) U.S. Cl. ......................................... 385/18; 385/16
(58) Field of Search ..................................... 385/16–18

(56) References Cited

U.S. PATENT DOCUMENTS

| 4,741,588 | A | * | 5/1988 | Nicia et al. | 385/37 |
|---|---|---|---|---|---|
| 5,999,672 | A | * | 12/1999 | Hunter et al. | 385/37 |
| 6,097,859 | A | * | 8/2000 | Solgaard et al. | 385/17 |
| 6,097,860 | A | * | 8/2000 | Laor | 385/17 |
| 6,108,471 | A | * | 8/2000 | Zhang et al. | 385/37 |
| 6,181,853 | B1 | * | 1/2001 | Wade | 385/37 |
| 6,204,946 | B1 | | 3/2001 | Aksyuk et al. | 359/131 |
| 6,236,780 | B1 | * | 5/2001 | Wade | 385/37 |
| 6,243,513 | B1 | * | 6/2001 | Wade | 385/24 |
| 6,263,127 | B1 | | 7/2001 | Dragone et al. | 385/24 |
| 6,269,203 | B1 | * | 7/2001 | Davies et al. | 385/24 |
| 6,282,337 | B1 | * | 8/2001 | Horwitz et al. | 385/24 |
| 6,498,872 | B2 | | 12/2002 | Bouevitch et al. | 385/24 |
| 6,501,877 | B1 | * | 12/2002 | Weverka et al. | 385/31 |
| 6,549,691 | B1 | * | 4/2003 | Street et al. | 385/18 |
| 6,549,692 | B1 | * | 4/2003 | Harel et al. | 385/18 |
| 6,549,699 | B2 | * | 4/2003 | Belser et al. | 385/24 |
| 6,671,428 | B1 | * | 12/2003 | Yang et al. | 385/18 |
| 6,731,833 | B2 | * | 5/2004 | Sandler et al. | 385/17 |
| 6,792,177 | B2 | * | 9/2004 | Welsh et al. | 385/18 |
| 6,922,239 | B2 | * | 7/2005 | Solgaard et al. | 356/326 |

FOREIGN PATENT DOCUMENTS

| JP | 2000-347065 | 12/2000 |
|---|---|---|
| JP | 2003-515187 | 4/2003 |

OTHER PUBLICATIONS

B. J. Chang, et al., "Dichromated Gelatin For The Fabrication of Holographic Optical Elements", Applied Optics, vol. 18, No. 14, pp. 2407-2417, Jul. 15, 1979.
S. H. Oh, et al., "Wavelength-Selective 1×4 Switch for 128 WDM Channels at 50 GHz Spacing", Technical Digest of OFC (Conference on Optical Fiber Communication), 2002 Postdeadline Papers, FB7-1-FB7-3, 2002.
S.P. O'Neil, et al., "High-Dynamic Range Channellzed MEMs Equalizing Filter", OFC 2002, ThCC3, pp. 586-588, Mar. 21, 20202.

* cited by examiner

Primary Examiner—Ellen E. Kim
(74) Attorney, Agent, or Firm—Staas & Halsey LLP

(57) ABSTRACT

An optical switching device of which cost and size are smaller than the conventional is provided. In the optical switching device, a spectroscopy section in each of optical switches disposed being piled up to plural layers is integrally formed. And there are provided with a first light control element integrally formed on paths of light beams, which are outputted from each of the first ports in each of the optical switches disposed being piled up to plural layers and propagate in space, a second light control element integrally formed on paths of the light beams, which are outputted from the spectroscopy section and propagate in space, and a third light control element formed integrally with each of second ports at a position corresponding to the reflection direction by reflector on paths of the reflected beams passed through the spectroscopy section in each of the optical switches.

15 Claims, 26 Drawing Sheets

OPTICAL SWITCHING DEVICE

CROSS REFERENCE TO RELATED APPLICATIONS

This application is based on and hereby claims priority to Japanese Application No. 2004-296846 filed on Oct. 8, 2004 in Japan, the contents of which are hereby incorporated by reference.

BACKGROUND OF THE INVENTION

1) Field of the Invention

The present invention relates to optical switching devices suitably applicable to the case where the path is switched over based on the light wavelength. For example, the present invention relates to optical switching devices employed in optical switching nodes, which conduct the line switching of the light as it is in an optical fiber communication network system built by applying the wavelength multiplexing technique. In particular, the present invention relates to optical switching devices, which separate the light having multiplexed wavelengths based on the wavelength; then, select plural paths separately based on the respective wavelengths, and finally multiplex a plurality of light beams on the same path to output the light therefrom. Further specifically, the present invention relates to an optical switching device including a plurality of integrated devices, which switches over optical paths between a single-port and a plural-port based on the light wavelengths.

Hereinafter, in this specification, a wavelength-selective optical switch as a device for switching over the optical path based on the light wavelengths is defined as below. That is, at least one port at a side is used as the input port, and the ports other than the input port are used as the output ports; and the switch will be referred to as "(number of input ports)×(number of output ports) wavelength-selective optical switch" based on the number of the input ports and the output ports.

2) Description of the Related Art

A conventional M×M wavelength-selective optical switch is constituted of a plurality of independent 1×N wavelength-selective switches. For example, FIG. 21 shows an example of a conventional M×M (M=3) wavelength-selective optical switch. A 3×3 wavelength-selective switch 100 shown in FIG. 21 is constituted of three 1×N (N=2) wavelength-selective optical switches 101–103 and three N×1 wavelength-selective optical switches 104–106.

That is, the 3×3 wavelength-selective optical switch 100 shown in FIG. 21 is provided with three ports 107-1 to 107-3. It is arranged such that the light, which enters the respective ports 107-1 to 107-3, is outputted selectively to a path to which one of the two ports other than the own port is connected in the 1×2 wavelength-selective optical switches 101–103. Also, in each of the ports 107-1–107-3, the 2×1 wavelength-selective optical switches 104–106 selects one of the signals from a 1×2 wavelength-selective switch in the two ports other than the own port and outputs the signal therefrom. For example, it is arranged such that the light, which enters the port 107-1, is output selectively to a path connect with one of the two ports 107-2 and 107-3 other than the input port in the 1×2 wavelength-selective optical switch 101. And, in the port 107-1, the 2×1 wavelength-selective optical switch 104 selects one of the signals from the 1×2 wavelength-selective switches 102 and 103 in the ports 107-2 and 107-3 other than the port 107-1, and output the signal therefrom. Accordingly, in the 3×3 wavelength-selective optical switch 100 shown in FIG. 21, it is impossible to select a path which returns the signal to the port at the sending side of the signal.

FIG. 22 also is a diagram showing a conventional M×M (M=4) wavelength-selective optical switch 110. The 4×4 wavelength-selective switch 110 shown in FIG. 22 is an example, which is constituted of four 1×4 wavelength-selective optical switches 111 to 114 and four 4×1 wavelength-selective optical switches 115 to 118, and is capable of selecting a path, which returns the signal to a port at the sending side of the signal.

In particular, the optical switch 110 is provided with four ports 119-1 to 119-4. And it is arranged such that the light, which enters each of the ports 119-1 to 119-4, is outputted selectively to a path to which any one of the four ports 119-1 to 119-4 including the input port is connected in the 1×4 wavelength-selective optical switches 111 to 114. And, in each of the ports 119-1 to 119-4, the 4×1 wavelength-selective optical switches 115 to 118 select one of the signals from the 1×4 wavelength-selective switches 111 to 114 in the four ports 119-1 to 119-4 including the own ports 119-1 to 119-4.

For example, it is arranged such that the light, which enters the port 119-1, is outputted selectively to a path connected with any one of the ports 119-1 to 119-4 including the own port 119-1 in the 1×4 wavelength-selective optical switch 111. And in the port 119-1, the 4×1 wavelength-selective optical switch 115 selects one of the signals from the 1×4 wavelength-selective switch 111–114 in the ports 119-1 to 119-4 including the own port 119-1, and outputs the signal therefrom. Accordingly, the 4×4 wavelength-selective optical switch 110 shown in FIG. 22 is capable of selecting a path which returns the signal to the output port at the sending side of the signal.

The 1×N wavelength-selective optical switch and the N×1 wavelength-selective optical switch are the devices used in the above-described M×M wavelength-selective optical switches 100, 110 and the like, which switch over the optical path between the single-port and the plural-port based on the light wavelength. In many cases, the M×M wavelength-selective optical switches 100, 110 are generally obtained with the same constitution by using the wavelength-selective optical switches with their input and output ports inversed each other.

The wavelength-selective optical switches in FIGS. 21 and 22 are shown as a single switch. However, actually, the switches are capable of switching over independently based on the WDM (Wavelength Division Multiplexing) light; i.e., based on the wavelength channel of the wavelength multiplexed light.

The following patent document 1 discloses an example of constitution of a wavelength-selective optical switch as a device for switching over the optical path between the single-port and the plural-port based on the light wavelength, which is used in the M×M wavelength-selective switches as described above.

The 1×N (N×1) wavelength-selective optical switch 120 as a device for switching over the optical path between the single-port and the plural-port based on the light wavelength, which is disclosed in the patent document 1 is constituted of, for example, as show in FIG. 23, ports 121 (121-1, 121-2, . . . ) formed of N optical fibers, first lenses 122 (122-1, 122-2, . . . ) disposed corresponding to each of the ports 121, a diffraction grating 123, a second lens 124 and a movable minute mirror 125.

Further, the following patent documents 2 to 4 disclose examples of constitution of the 1×N (N×1) wavelength-selective optical switches.

[Patent document 1] U.S. Pat. No. 6,549,699 Specification

[Patent document 2] U.S. Pat. No. 6,498,872 Specification

[Patent document 3] Published Japanese translation of PCT international publication application No. 2003-515187

[Patent document 4] U.S. Pat. No. 6,204,946 Specification

A conventional M×M wavelength-selective switch is constituted of a plurality of; i.e., in general, 2M independent wavelength-selective optical switches, which switch over the optical path between the single-port and the plural-port based on the light wavelength (M of the 1×N wavelength-selective optical switches and M of the N×1 wavelength-selective optical switches). To manufacture the conventional M×M wavelength-selective switch, members of 2M times as many as members necessary for a single 1×N (or N×1) wavelength-selective switch are required. And further, the manhours of 2M times as much as the manhours necessary for assembling a single 1×N (or N×1) wavelength-selective switch is required, thereby leading to the relatively large cost necessary for the entire device. In addition to that, there is such problem that, since M of 1×N wavelength-selective optical switches and M of N×1 wavelength-selective optical switches are used, the size of the entire device becomes larger in proportion to the number of the used 1×N (and N×1) wavelength-selective switches.

SUMMARY OF THE INVENTION

In view of the above-described problem, the present invention has been proposed. It is an object of the present invention to provide an optical switching device, which is capable of, when a plurality of 1×N wavelength-selective switches and N×1 wavelength-selective optical switches are combined, reducing the number of the members and the amount of assembling manhours smaller than the conventional, and reducing the cost and size of the entire device smaller than those in the conventional example.

In order to achieve the aforementioned object, an optical switching device according to the present invention is an optical switching device comprising a plurality of optical switches, in which each of the optical switches has a first port; N (N is a plural number) of second ports, which are capable of being optically connected to the first port, being disposed in parallel with the first port; a spectroscopy section capable of refracting a light beam, which is outputted from the first port or second ports, in the different directions depending on the wavelength as well as in the direction in which the first port and second ports are disposed; and a reflector capable of reflecting the light beams, which are refracted by the spectroscopy section in the different directions depending on the wavelength, in the reflection directions preset based on the wavelength, wherein each of the optical switches are adapted so that the reflected beams having the wavelength, which are reflected by the reflector, are inputted to the first or second ports disposed at a position corresponding to the reflection direction, and disposed integrally being piled up to plural layers, in which the optical switching device is formed so that the optical switches share the spectroscopy section with each other, the optical switching device further includes a first light control element that is formed integrally on the paths of a plurality of light beams, which are outputted from each of the first ports in each of the optical switches and propagate in space, and is capable of converting the plurality of light beams outputted from the first ports of the optical switches into collimated light beams to output the collimated light beams to relatively and substantially the same point on the spectroscopy section; a second light control element that is capable of condensing the light, which has the same wavelength in the light outputted from the first port and the second ports constituting a specific optical switch in the piled up optical switches and separated, to a point; and a third light control element that is, assuming that i is a positive integer number equal to N or less and the i-th column in the N of second ports of the plurality of optical switches disposed being piled up to plural layers is the second ports in the i-th set, formed integrally on the paths of the plurality of light beams, which are outputted from the second ports in the i-th set and propagate in space, and capable of converting the light beams outputted from the second ports of the plurality of optical switches into a plurality of collimated light beams to output the collimated light beams to substantially the same point in the spectroscopy section.

Further, each of the first light control element, second light control element and third light control element may be constituted of a convex lens respectively, and the spectroscopy section is constituted of a diffraction grating in the shape of a parallel plate. In this case, the diffraction grating in the shape of a parallel plate constituting the spectroscopy section may be a transmissive diffraction grating in the shape of a parallel plate, or a transmissive diffraction grating in the shape of a parallel plate.

Further, each of the optical switches as the unit to be disposed being piled up may be structured so that the first port is the input port and the plurality of second ports are the output ports, thereby a 1-input & N-output wavelength-selective optical switch, which is capable of outputting the light beams inputted from the first port via the second ports arranged as the targets of output based on the wavelength, is formed; and may be structured so that the first port is the output port and the N of second ports are the input ports, thereby an N-input & 1-output wavelength-selective optical switch, which is capable of selectively outputting the light beam inputted from the N of second ports through the first port based on the wavelength, is formed.

Further, the first to third light control elements may be arranged such that a plurality of light beams, which are outputted from the plurality of first ports or inputted to the plurality of first ports constituting the plurality of optical switches deposed being piled up, pass through substantially the same point in the spectroscopy section; as well as so that, assuming that i is a positive integer number equal to N or less, the plurality of light beams, which are inputted to the second ports in the i-th set or outputted from the second ports in the i-th set in the N sets of second ports constituting the plurality of optical switches disposed being piled up, pass through substantially the same point in the spectroscopy section.

Further, the above optical switching device, may further comprises at least one first physical status dependent (PSD) light beam separating/combining section that, being optically connected to the first ports constituting each of the optical switches piled up to plural layers, separates or combines the light beam corresponding to the physical status of the light beam, and a plurality of second PSD light beam separating/combining sections that, being optically connected to the second ports at the respective positions corresponding to the reflection direction by the reflector in the second ports constituting each of the optical switches piled up to plural layers, separate or combine the light beam corresponding to the physical status of the light beam, wherein the optical switching device is arranged such that the light beam separated by the first PSD light beam separating/combining section is outputted to the first light control elements through the first ports different from each other, and the light beam outputted to the second PSD light beam separating/combining sections from the second ports is combined by the second PSD light beam separating/combining sections, and the light beam separated by the second PSD light beam separating/combining sections is outputted to the third light control element through the second ports different from each other, and the light beam outputted to the first PSD light beam separating/combining section from the first ports is combined by the first PSD light beam separating/combining section.

In the above case, the first and second PSD light beam separating/combining sections may be constituted of a optical waveguide device respectively. And the first and second PSD light beam separating/combining sections may be arranged so as to separate/combine the light beam based on the wavelength.

In the above case, the optical switching device may be arranged such that the light beam separated by the first PSD light beam separating/combining section is imparted to the optically connected first ports at predetermined intervals of optical wavelength in order; and the light beam separated by the second PSD light beam separating/combining sections is imparted to the optically connected second ports at predetermined intervals of optical wavelength in order.

Further, the first and second PSD light beam separating/combining sections may be arranged so as to separate/combine the light beam corresponding to the polarized light component. Further, the optical switching device may be comprised of M of N-input optical couplers as well as M (M=N+1) of the optical switches disposed being piled up to layers, wherein M sets of switch & optical couplers, in which M of the optical switches are formed into a 1-input & N-output wavelength-selective optical switch, and one of the 1-input & N-output wavelength-selective optical switch and one of the N-input optical coupler are formed as a set, and an optical connecting element that connects N of inputs of the N-input optical coupler, which are included in a specific set of switch & optical coupler, to N of second ports, which are obtained by selecting each one of second port from one optical switch in N of optical switches included in N sets of switch & optical coupler other than the specific set of the switch & optical coupler, in a one-to-one manner respectively.

Further, the optical switching device may be provided with 2×M (M=N+1) of the optical switches disposed being piled up to layers, the 2×M of the optical switches may be arranged to M of switch sets, which are constituted of one of the 1-input & N-output wavelength-selective optical switch and one of the N-input & 1-output wavelength-selective optical switch as a set, and an optical connecting element, which connects N of inputs of the N-input & 1-output wavelength-selective optical switch, which are included in a specific switch set, to N of second ports, which are obtained by selecting each of one second port from one wavelength-selective optical switch in N of 1-input & N-output wavelength-selective optical switches included in N of switch sets other than the specific switch set in a one-to-one manner respectively.

As described above, according to the optical switching device of the present invention, the spectroscopy section and the first to third light control elements are provided, whereby as compared with the case where each of the constituent elements is disposed independently for each of the optical switches, which are disposed being piled up, the number of parts is reduced as a whole. Accordingly, in addition to such effect that cost of parts is reduced, such effect that the size of the parts can be largely reduced is obtained.

DESCRIPTION OF THE PREFERRED EMBODIMENTS

Figure 1:
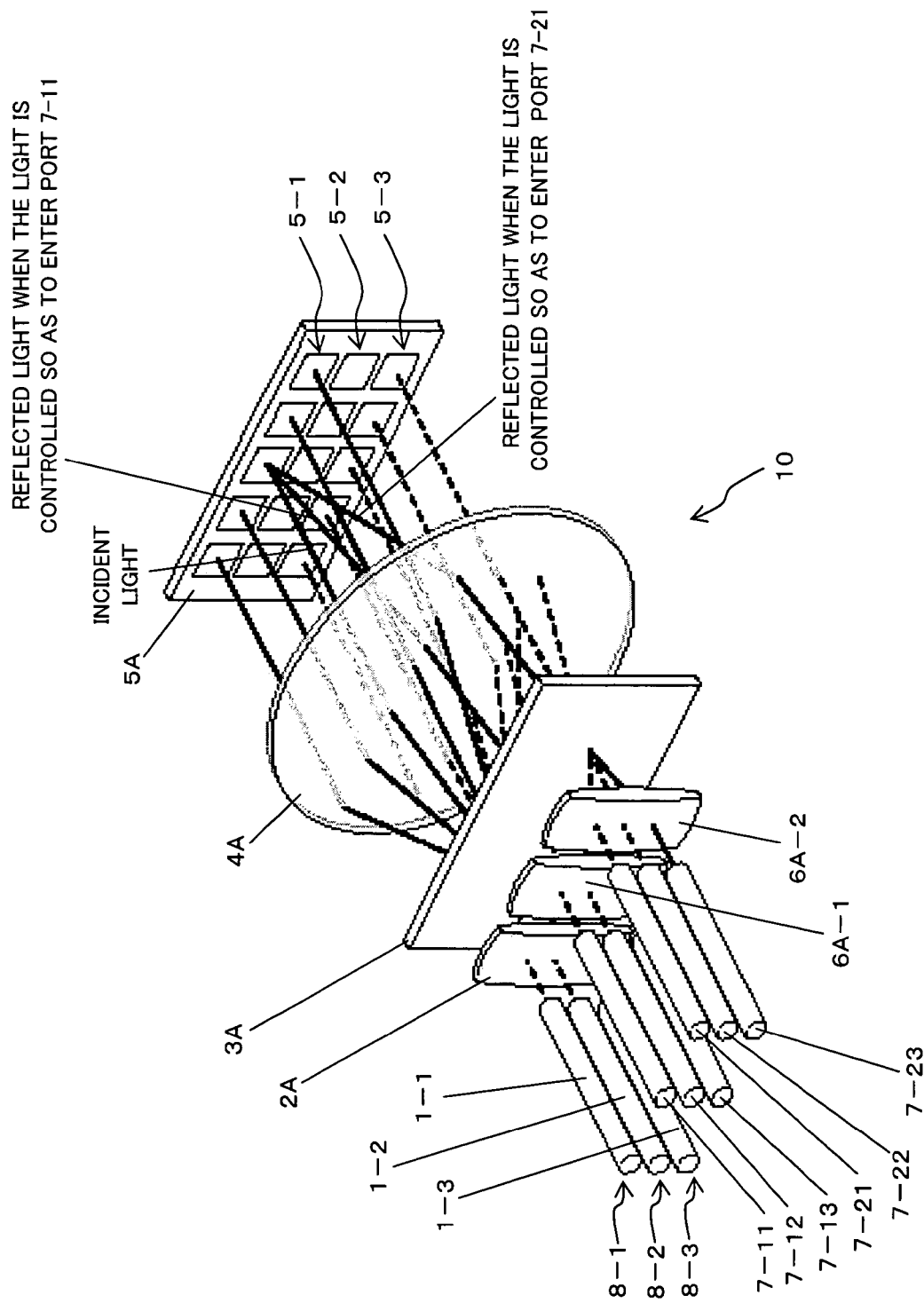
FIG. 1 is a perspective view schematically showing an optical switching device according to a first embodiment of the present invention.

Now, referring to the drawings, embodiments of the present invention will be described. An object of the present invention is to provide an optical switching device, which, when a plurality of 1×N wavelength-selective switches and N×1 wavelength-selective optical switches are combined, compared to the conventional, is capable of reducing the number of components and assembling manhours, and compared to the conventional example, reducing the cost and size of the entire device. The description in the specification is not intended to prevent the present invention from incorporating techniques for solving the technical problems, which can be solved by the disclosed technique as the problems to be solved by the invention or from providing articles or methods to solve the problems.

[A] Description of First Embodiment

Figure 2:
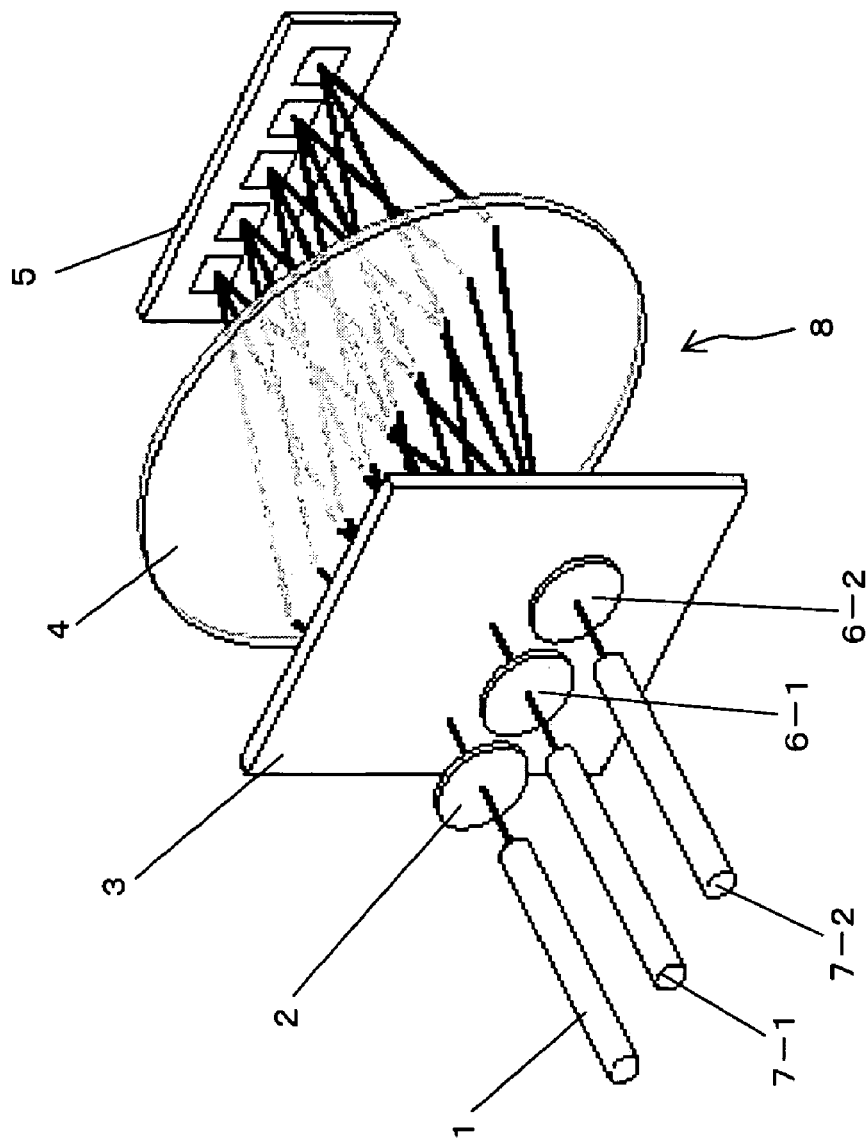
FIG. 2 is a perspective view schematically showing a 1×2 (2×1) wavelength-selective optical switch constituting the optical switching device according to the first embodiment of the present invention.

[A-1] Constitution of Optical Switching Device 10 According to First Embodiment FIG. 1 is a perspective view schematically showing an optical switching device 10 according to a first embodiment of the present invention. The optical switching device 10 shown in FIG. 1 is formed of a plurality of wavelength-selective optical switches 8, which switch over optical path between, for example, a single-port and a plural-port as shown in FIG. 2 based on light wavelength (in this case, three wavelength-selective optical switches 8-1 to 8-3) being piled up one after another. The wavelength-selective optical switch 8 shown in FIG. 2 is capable of functioning as, for example, a 1×2 wavelength-selective optical switch or a 2×1 wavelength-selective optical switch. The constitution of the present invention is applicable to 1×N wavelength-selective switch or N×1 wavelength-selective switch (N is 3 or more). However, hereinafter, for convenience of description, if not otherwise defined, the description will be given focusing on the function as the 1×2 wavelength-selective optical switch 8.

A wavelength 1 selective optical switch 8 shown in FIG. 2 comprises, for example, a first port 1 formed of an optical fiber, second ports 7-1 and 7-2, a first convex lens 2, a spectroscopy section 3, a second convex lens 4, a reflector 5 and third convex lenses 6-1 and 6-2. Here, the above first port 1 and second ports 7-1 and 7-2 are disposed in parallel. The first convex lens 2 and the third convex lenses 6-1 and 6-2 are disposed so as to face the first ports 1, 7-1 and 7-2 respectively. Further, the spectroscopy section 3, the second convex lens 4 and the reflector 5 are disposed in this order.

The second ports 7-1 and 7-2 are formed of an optical fiber or the like, which is capable of optical connection with the optical fiber as the first port 1 being able to be optically coupled by an optical system (which will be described later) constituting the wavelength-selective optical switch 8. A plurality (N fibers; in this case, 2 fibers) of the optical fibers is disposed in parallel with the first port 1. As for the optical fiber constituting the above-mentioned first and second ports 1, 7-1 and 7-2, for example, a single-mode optical fiber with the core diameter of approximately 10 micron and the clad diameter of approximately 125 micron is available.

The first convex lens 2 is disposed on a path of light beam, which is outputted from the first port 1 and propagates in space. And the first convex lens 2 is capable of converting the light beam outputted from the first port 1 into collimated light beams and outputting the beams to the spectroscopy section 3 respectively.

Further, the spectroscopy section 3 is capable of refracting the light beam outputted from the first or second ports 1, 7-1 and 7-2 toward the directions different from each other depending on the wavelength as well as the ones corresponding to the directions in which the first and second ports are disposed (i.e., substantially the same direction), wherein the spectroscopy section 3 may be formed of, for example, a transmissive diffraction grating of a plane plate shape. (A means, which is capable of spatially separating the light having different wavelengths so that the light proceeds in the different directions, for example, a prism or a diffraction grating can be employed: the refraction when a prism or the like is employed; or, the diffraction when a diffraction grating is employed, causes the light path to be bent to an angle corresponding to the wavelength and split. Hereinafter, the above will be referred to as "refraction" including the case of the diffraction).

Figure 3:
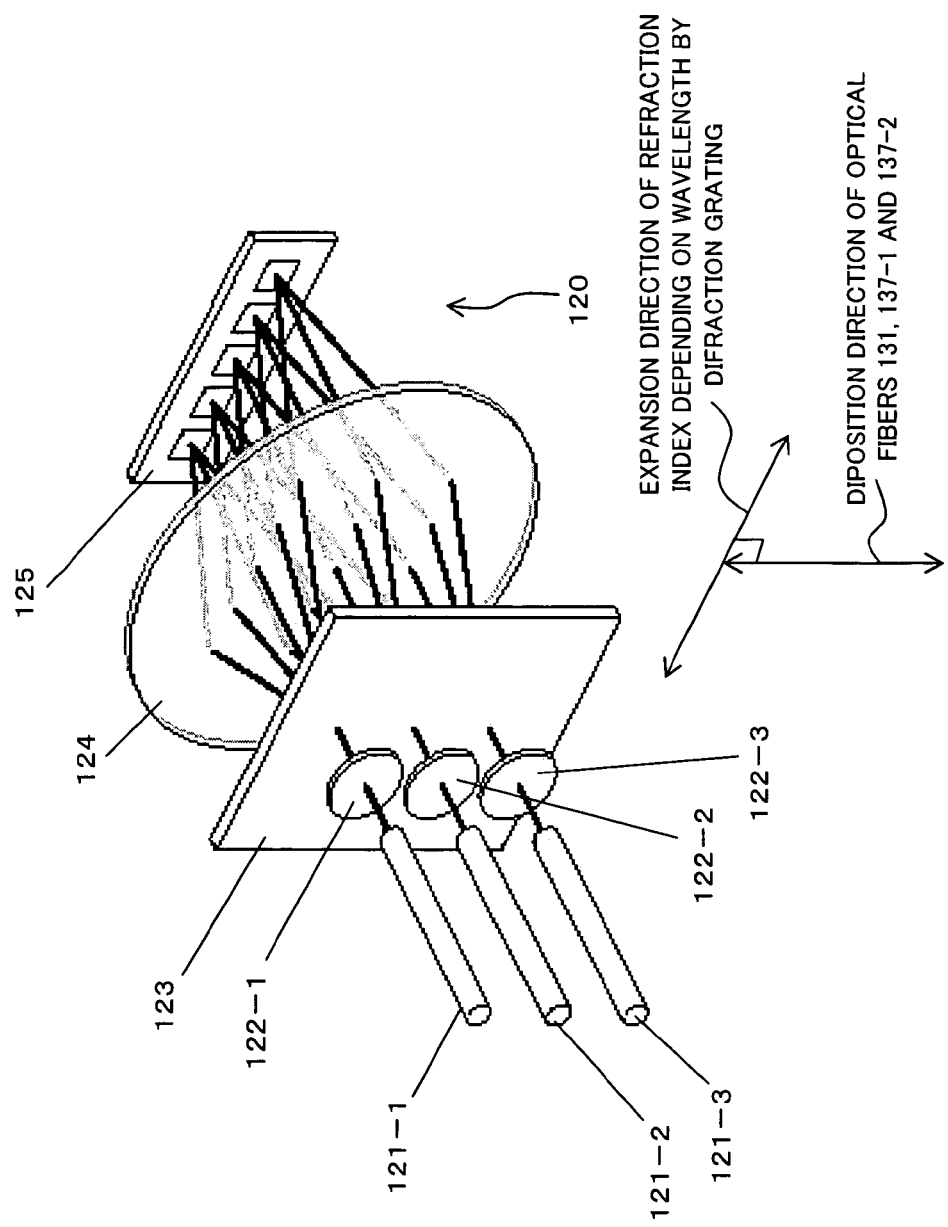
FIG. 3 is a perspective view schematically showing a 1×2 wavelength-selective optical switch, which is a constitutional unit of a 1×N wavelength-selective optical switch shown in FIG. 23.
Figure 23:
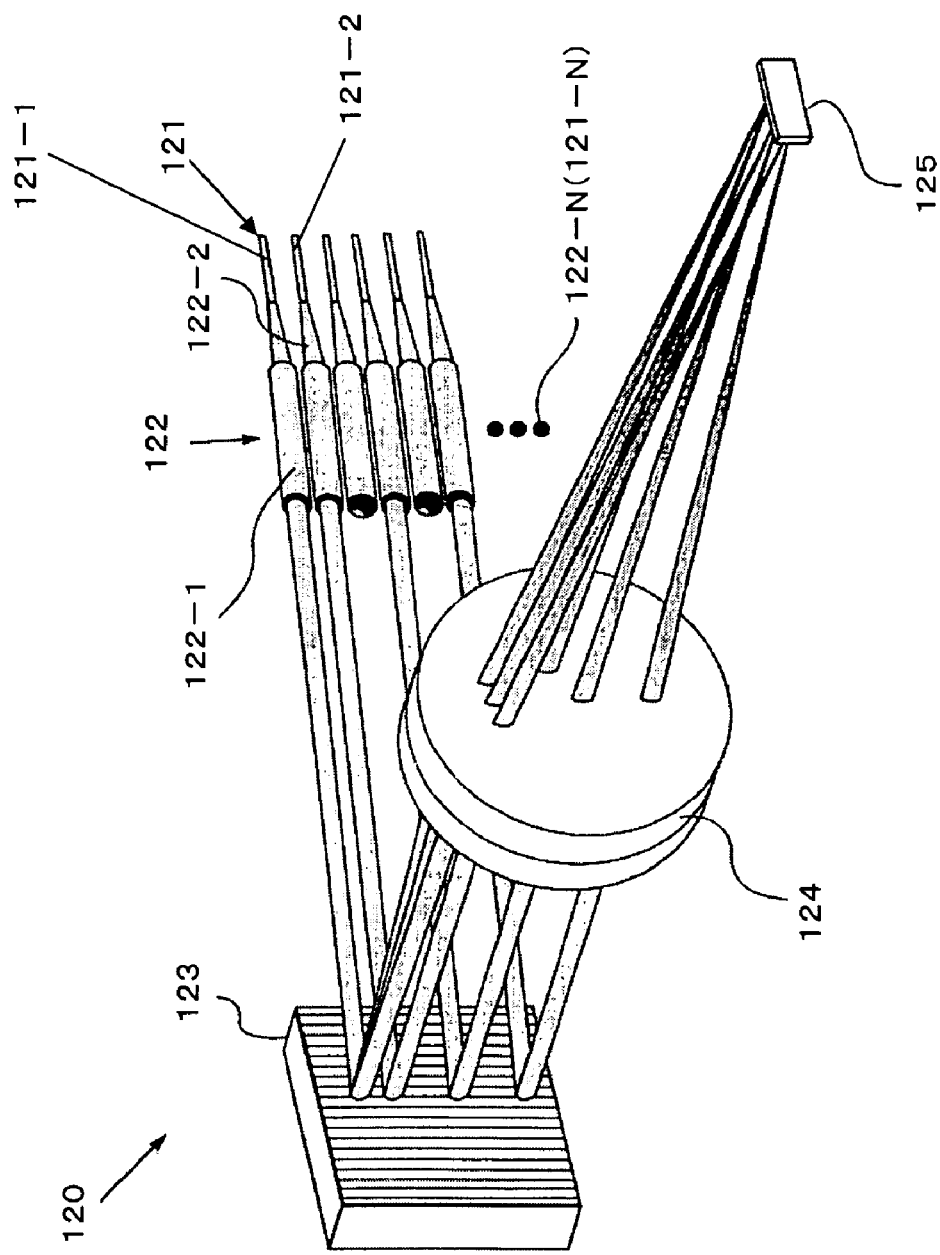
FIG. 23 is a diagram showing a conventional art.

That is, the above-described 1×N wavelength-selective optical switch 120 shown in FIG. 23 has the following structure. That is, like a 1×2 wavelength-selective optical switch 120' shown in FIG. 3, the optical fiber 121-1 corresponding to the first port and the optical fibers 121-2 121-3 corresponding to the second ports are arranged in the direction perpendicular to the refraction direction of the light when the light inputted from the optical fiber 121-1 is refracted by the diffraction grating 123 as the spectral element at different angles based on the wavelength. On the other hand, the 1×2 wavelength-selective optical switch 8 shown in FIG. 2 has the following structure. That is, the first port 1 and the second ports 7-1 and 7-2 are arranged in the same direction as the refraction direction in which the light inputted from the optical fiber 121-1 is refracted by the diffraction grating 3 at different angles based on the wavelength.

The second convex lens 4 is disposed on the path of the light beam, which is outputted from the above-described spectroscopy section 3 and propagates in space. The second convex lens 4 is capable of condensing the light beams from the spectroscopy section 3 at a point respectively based on the wavelength and outputting the beams to the reflector 5 through different light paths respectively. The second convex lens 4 may be constituted of, for example, a convex lens.

Further, the reflector 5 is capable of reflecting the light beams, which are refracted by the spectroscopy section 3 in the different directions based on the wavelength, in the reflection directions, which are preset based on the wavelength. The reflector 5 may be constituted of, for example, an MEMS (Micro Electro Mechanical System) mirrors including a plurality of mirrors, which are capable of being inclined in the directions preset based on the wavelength, and are disposed on the light paths of the light beams of respective wavelength outputted from the above-described second convex lens 4.

It is arranged such that, corresponding to the reflection angle based on the wavelength of the reflected light beams, the reflected light beams reflected by the reflector 5 enter one of the third convex lenses 6-1 and 6-2 after passing through the above-described second convex lens 4 and the spectroscopy section 3. As is the case with the above-described first convex lens 2, the third convex lenses 6-1 and 6-2 are constituted of a convex lens respectively so as to condense the reflected light beams, which enter thereat after passing through the second convex lens 4 and the spectroscopy section 3, and to guide the light beams respectively to the second ports 7-1 and 7-2 facing thereto.

Thereby, it is arranged such that the reflected beams having the respective wavelengths, which are reflected by the reflector 5, are inputted to the second ports 7-1 and 7-2, which are disposed at a position respectively corresponding to the reflection direction, via the second convex lens 4, the spectroscopy section 3 and the third convex lense 6-1, 6-2. In other words, it is possible to selectively guide the reflected beams of the light beams, which are inputted to the first port 1, to either one of the second ports 7-1 and 7-2 by means of the reflection angle, which is preset based on the wavelength component in the reflector 5, so that the switch can function as a 1-input & 2-output wavelength-selective optical switch.

Also, in the case where the wavelength-selective optical switch 8 is used to function as a 2-input & 1-output wavelength-selective switch, in the way similar to the case where the switch is used to function as the above-described 1-input & 2-output wavelength-selective switch, the light beams outputted from the second ports 7-1 and 7-2 toward the third convex lenses 6-1 and 6-2 are selectively guided to the first port 1 by presetting the reflection angle with respect to the light beams having the respective wavelengths in the reflector 5.

As described above, in the optical switching device 10 according to the first embodiment, the optical switches 8-1 to 8-3, which are the units to be disposed being piled up, are structured so that the first ports 1-1 to 1-3 are the input ports and the second ports 7-11 to 7-13 and 7-21 to 7-23 are the output ports. Thereby, there is made possible a configuration as a 1-input & 2-output wavelength-selective optical switch, which is capable of outputting the light beams inputted from the first ports 1-1 to 1-3, via the second ports 7-11 to 7-13 and 7-21 to 7-23, which are preset as the output target based on the wavelength. Further, by structuring the optical switches 8-1 to 8-3 so that the first ports 1-1 to 1-3 are the output ports and the second ports 7-11 to 7-13 and 7-21 to 7-23 as the input ports, there is made possible a configuration as a 2-input & 1-output wavelength-selective optical switch, which is capable of selectively outputting the light beams inputted from the second ports 7-11 to 7-13 and 7-21 to 7-23 based on the wavelength via the first ports 1-1 to 1-3.

As described above, the optical switching device 10 according to the first embodiment is formed with three of the wavelength-selective optical switches 8, which are structured being pile up as described above. That is to say, from the top in FIG. 1, three of wavelength-selective optical switches 8-1 to 8-3 are integrally pile up. Here, reference numeral 1-1 to 1-3 denote the first ports of the wavelength-selective switches 8-1 to 8-3; 7-11 and 7-21 denote second ports of the wavelength-selective switch 8-1; 7-12 and 7-22 denote the second ports of the wavelength-selective switch 8-2; and 7-13, 7-23 are the second ports of the wavelength-selective switch 8-3 respectively. Here, the second ports 7-11, 7-12 and 7-13 and the second ports 7-21, 7-22 and 7-23 form a set of second ports respectively. The second ports 7-11, 7-12 and 7-13 will be referred to as first set of the second ports; and the second ports 7-21, 7-22 and 7-23 will be referred to as second set of the second ports. Likewise, in the case where N of output ports are provided to one wavelength-selective switch, assuming that i is a positive integer number equal to N or less, the i-th set of ports will be referred to as the i-th second ports.

Figure 4:
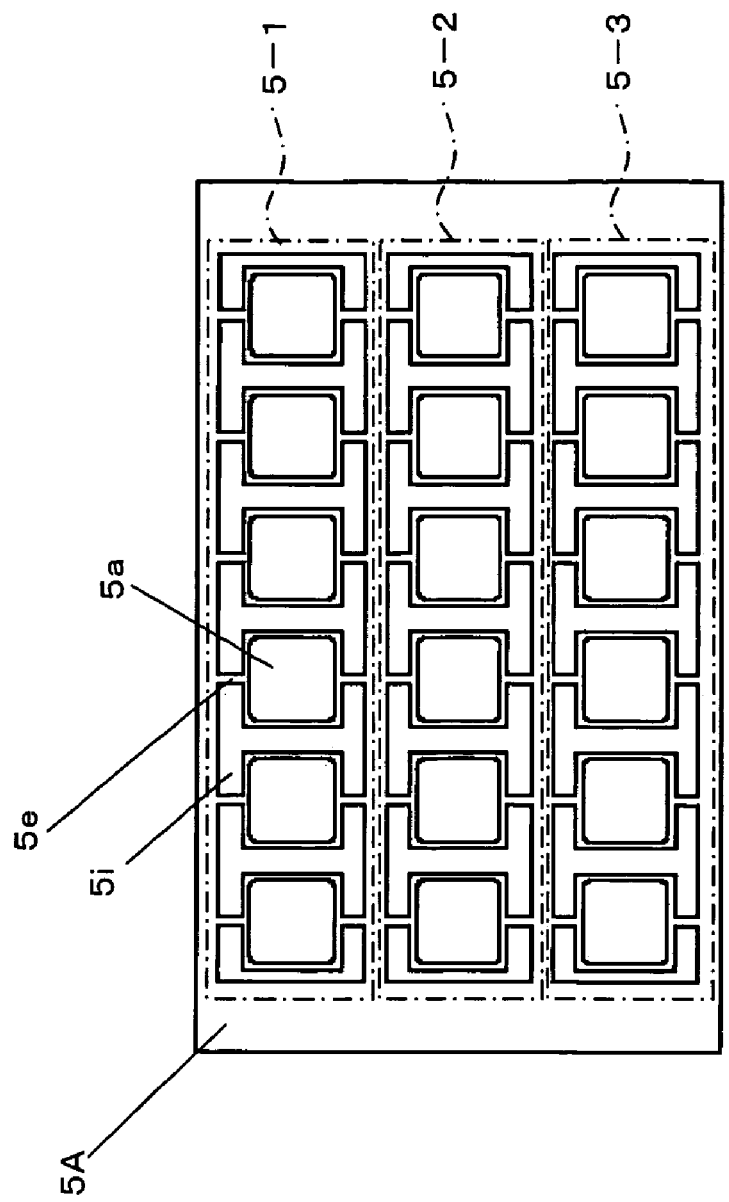
FIG. 4 is a diagram showing an MEMS mirror array in an essential part of the optical switching device according to a first embodiment of the present invention.

Reference numeral 5A denotes an MEMS mirror array, which is formed with integrally piled up reflectors 5-1 to 5-3 for the wavelength-selective optical switches 8-1 to 8-3; and which is structured, for example, as shown in FIG. 4. Each of the reflectors 5-1 to 5-3 is disposed with a plurality of (6 mirrors in FIG. 4) mirrors 5a so that the light beams, which are refracted and bent in different directions based on the wavelength by the spectroscopy section 3A, can be reflected by each of the independent mirrors. That is, the mirrors 5a constituting each of the reflectors 5-1 to 5-3 are also disposed in the directions (in the lateral direction in FIG. 4) corresponding to the refraction directions based on the wavelength by the spectroscopy section 3A.

Figure 5:
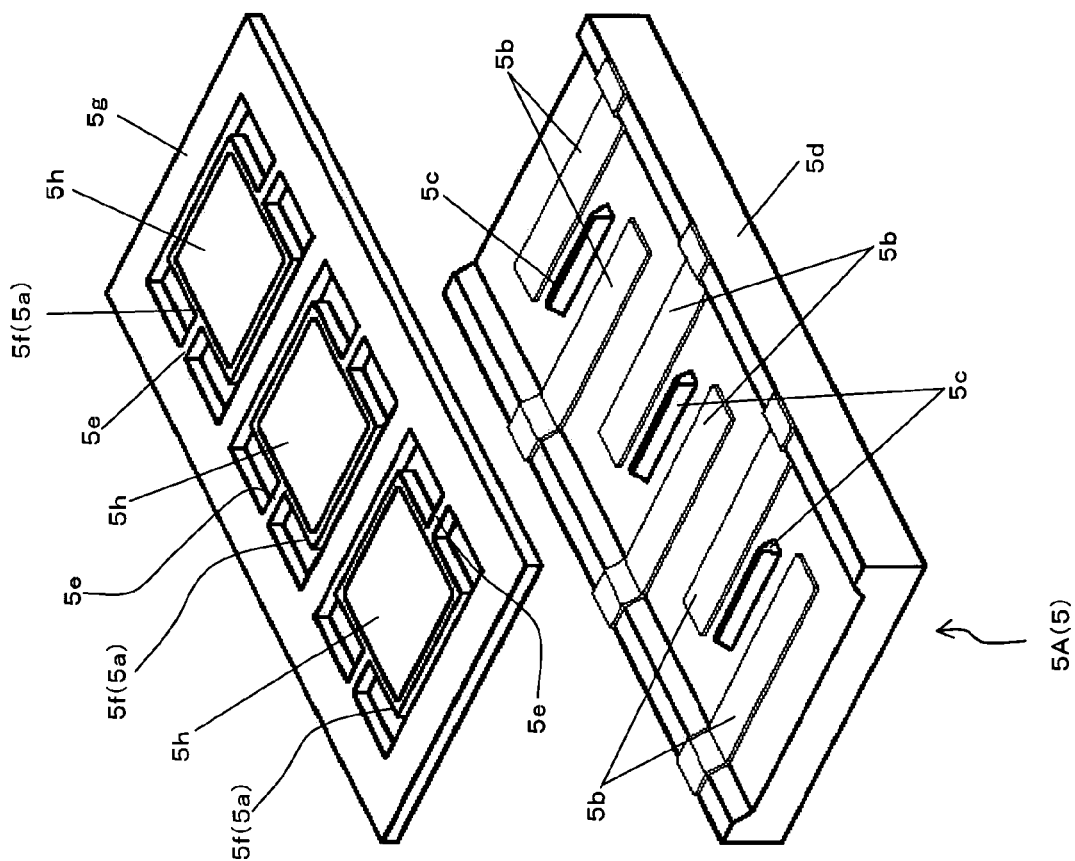
FIG. 5 is a perspective view schematically showing an exploded example of an essential part of the MEMS mirror array according to the first embodiment of the present invention.

FIG. 5 is a perspective view schematically showing an exploded example of an essential part of the above-described MEMS mirror array 5A (5). As for the mirror 5a, for example, as show in FIG. 5, such mirror applied with a silicon substrate 5g, which is formed with island-like rotating portions 5f leaving hinge portions 5e on a glass substrate 5d formed with supporting projections 5c and control electrodes 5b, may be employed. When a voltage is applied between the control electrode 5b and the silicon substrate 5g, the rotating portion 5f is rotated due to electrostatic attraction. Reference numeral 5i in FIG. 4 indicates a portion where the member is removed to form the island-like rotating portion 5f leaving the hinge portion 5e in the silicon substrate 5g.

That is, it is possible to preset the reflection angle of the light beams, by allowing the light beams to enter the rotating portions 5f as the mirrors 5a and by appropriately setting the inclination angle (reflection angle of the light beams) of the rotating portions 5f based on the magnitude of the voltage given to the control electrodes 5b. For example, it is arranged such that, when WDM light is inputted via the first port 1-1, each of the light beams comprised of wavelength channel components constituting the WDM light is reflected by each of the individual mirrors 5a, and by setting the inclination angle of each of the mirrors 5a individually, the ports 7-11, 7-21, to which the reflected beams of each of the wavelength channel components are guided, can be set individually.

By forming gold plating portions 5h on the rotating portions 5f, mirrors 5a with a small reflection loss can be obtained. Such MEMS mirror is disclosed in, for example, in a document: Technical Digest of OFC (Conference on Optical Fiber Communication) 2002, Thcc3, Post deadline Papers of OFC' 2002 FB70-2 and the like.

In the optical switching device 10 shown in FIG. 1, the spectroscopy section 3A constituting each of the wavelength-selective optical switches 8-1 to 8-3 is formed integrally for common use. The spectroscopy section 3A may be formed with a diffraction grating; particularly, may be formed with a transmissive diffraction grating in the shape of a parallel plate as disclosed in a document: APPLIED OPTICS VOL. 18, No. 14, pp. 2407–2417.

Further, the first convex lens 2, the second convex lens 4 and the third convex lenses 6-1, 6-2 constituting each of the wavelength-selective optical switches 8-1 to 8-3 are integrally formed as the first light control element 2A, the second light control element 4A and the third light control element 6A-1, 6A-2 respectively for common use.

That is, the first light control element 2A is formed integrally on the paths of the light beams, which are outputted from each of the first ports 1-1 to 1-3 and propagate in space, in each of the wavelength-selective optical switches 8-1 to 8-3 disposed being piled up to plural layers, and is arranged such that the light beams outputted from the first ports 1-1 to 1-3 of each of the wavelength-selective optical switches 8-1 to 8-3 are converted into collimated light beams and outputted to the spectroscopy section 3A respectively. The first light control element 2A may be formed of, for example, an integral convex lens.

Also, the second light control element 4A is formed integrally on the paths of the light beams, which are outputted from the spectroscopy section 3A, integrally formed as described above, and propagate in space, and is arranged such that the light beams in the wavelength-selective optical switches 8-1 to 8-3 from the spectroscopy section 3A can be condensed respectively at a point based on the wavelength and outputted to the reflectors 5-1 to 5-3. The second light control element 4A may be formed, for example, of an integral convex lens.

Further, with respect to the reflected beams reflected by the reflectors 5-1 to 5-3, the third light control elements 6A-1 and 6A-2 are integrally formed for each of the second ports 7-11 to 7-13 and 7-21 to 7-23 respectively, at the positions corresponding to the reflection directions by the reflectors 5-1 to 5-3 on the paths of the reflected beams, which are inputted via the second light control element 4A and the spectroscopy section 3A, and have passed through the spectroscopy section 3A in the above-described three wavelength-selective optical switches 8-1 to 8-3. The third light control elements 6A-1 and 6A-2 condense the reflected beams to output the reflected beams to the second ports 7-11 to 7-13 and 7-21 to 7-23 disposed at the positions corresponding to the reflection direction by the reflectors 5-1 to 5-3.

That is, the third light control element 6A-1 is integrally formed opposite to the disposition of the second ports 7-11 to 7-13 corresponding to the reflection directions based on the wavelength by the reflectors 5-1 to 5-3, and is arranged so as to condense the reflected beams from the spectroscopy section 3A to guide them to the second ports 7-11 to 7-13. Likewise, the third light control element 6A-2 is integrally formed opposite to the disposition of the second ports 7-21 to 7-23 corresponding to the reflection directions based on the wavelength by the reflectors 5-1 to 5-3, and is arranged so as to condense the reflected beams from the spectroscopy section 3A to guide to the second ports 7-21 to 7-23.

Figure 6:
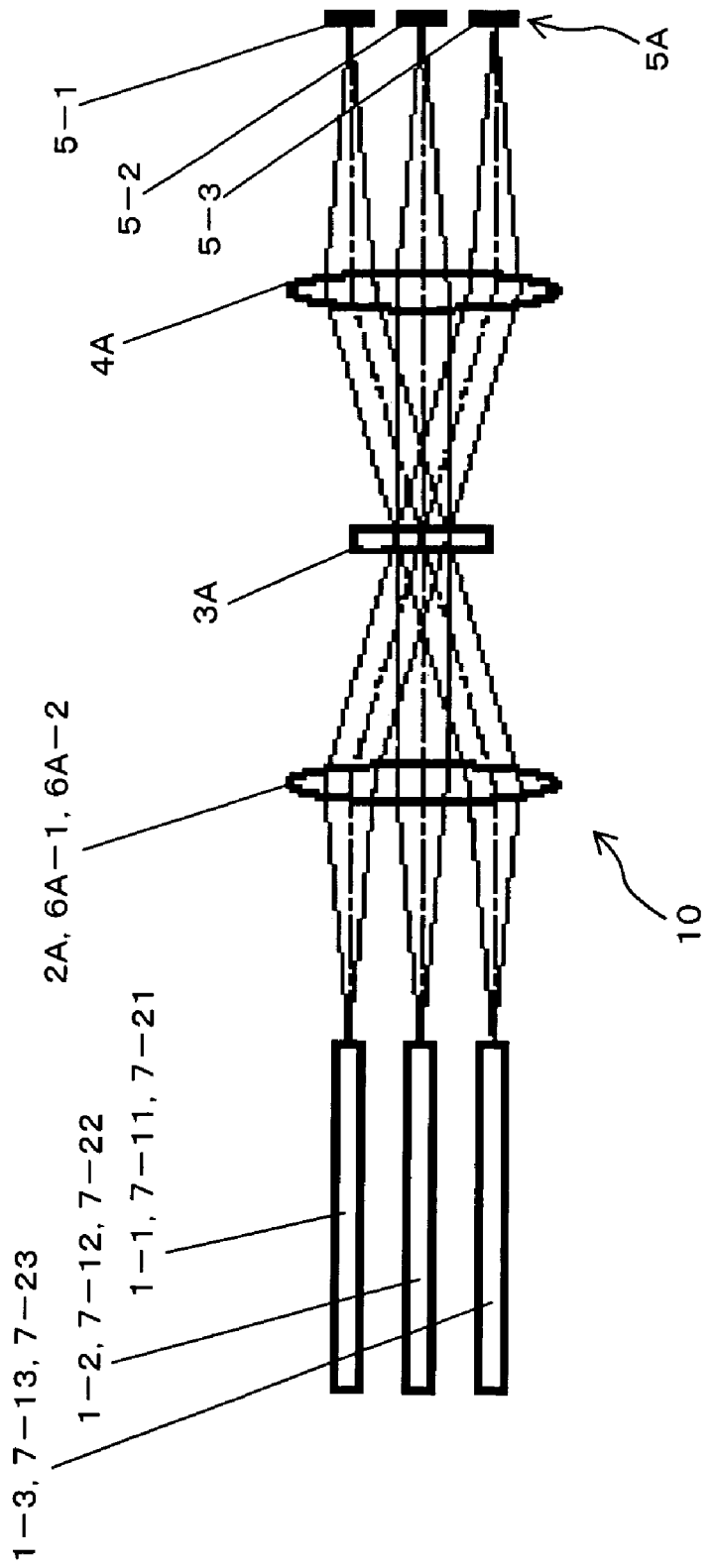
FIG. 6 is a front view schematically showing the optical switching device according to the first embodiment.

FIG. 6 is a front view schematically showing the optical switching device 10 according to the first embodiment. As shown in FIG. 6, the first to third light control elements 2A, 4A, 6A-1 and 6A-2, which are opposed to the spectroscopy section 3A, are formed so that each of the light beams outputted from the first ports 1-1 to 1-3 or the second ports 7-11 to 7-13 and 7-21 to 7-23 pass through substantially the same point in the spectroscopy section 3A; also each of the reflected beams of these light beams pass through substantially the same point in the spectroscopy section 3A.

Thus, as for the height of the spectroscopy section 3A, it is not necessary to increase the height in accordance with the distance between the light beams outputted from the piled up first ports 1-1 to 1-3 (or second ports 7-11 to 7-13 and 7-21 to 7-23). It is enough only if the spectroscopy section 3 has substantially the same height as the diameter of the beams that pass therethrough in the case where the plurality of the wavelength-selective optical switches 8-1 to 8-3 are not piled up (i.e., the wavelength-selective optical switch 8 shown in FIG. 2).

For the above-described first light control element 2A and the third light control elements 6A-1 and 6A-2, convex lenses having substantially the same configuration can be employed. And the convex lenses may be formed so that a part thereof is removed therefrom respectively to reduce the distance between the neighboring lenses.

Also, in the transmissive diffraction grating in the shape of a parallel plate as the above-described spectroscopy section 3A, a periodical distribution of refractive index is formed. Assuming that the period of the distribution of refractive index is $\Lambda$, the diffraction angle is $\theta$, the diffraction order is m, and the wavelength of the light is $\lambda$, the magnitude of the difference of the diffraction angle based on the wavelength (dispersion, partial differential relative to $\lambda$ of $\theta$) is expressed by the following formula (1).

$$\frac{\partial \theta}{\partial \lambda} = \frac{m}{\Lambda \times \cos(\theta)} \quad (1)$$

Here, when setting as m=1, $\Lambda$=1.2 $\mu$m, $\theta$=0°, the dispersion angle with respect to frequency intervals of 100 GHz (wavelength intervals of 0.08 nm) is approximately 0.00067 rad.

Accordingly, for example, the case where convex lenses with focal length of 48 mm are employed for the first light control element 2A and the third light control elements 6A-1 and 6A-2; and a convex lens with focal length of 150 mm is employed for the second light control element 4A respectively, is to result in the channel intervals of 100 $\mu$m and the diameter (radius) of the condensed beam spot of 16 $\mu$m at the focal points of the reflectors 5-1 to 5-3, when the frequency intervals of the WDM light is 100 GHz, so that the wavelength-selective optical switches 8-1 to 8-3, which has the transmissive characteristics of flattop is to be realized.

[A-2] Operation and Effect of the Optical Switching Device 10 According to the First Embodiment In the optical switching device 10 structured as described above, by appropriately setting the inclination angle of the mirrors 5a (refer to FIG. 4) constituting the reflectors 5-1 to 5-3, each of the piled up wavelength-selective optical switches 8-1 to 8-3 can operate as an independent optical switch.

In particular, when the wavelength-selective optical switches 8-1 to 8-3 are assembled as a 1×2 wavelength-selective optical switch, for example, the WDM light, which is inputted from the first ports 1-1 to 1-3, can be outputted selectively to the second ports 7-11 to 7-13 and 7-21 to 7-23. Here, the second ports 7-11 to 7-13 and 7-21 to 7-23 as the output targets can be set individually based on the wavelength.

Also, when the wavelength-selective optical switches 8-1 to 8-3 are assembled as a 2×1 wavelength-selective optical switch, by appropriately setting the inclination angle of the mirrors 5a constituting the reflectors 5-1 to 5-3, for example, the WDM light, which is inputted from the second ports 7-11 to 7-13 and 7-21 to 7-23 can be outputted selectively to the first ports 1-1 to 1-3 based on the wavelength.

Here, in the optical switching device 10 according to the first embodiment, the spectroscopy section 3A for the wavelength-selective optical switch 8-1 to 8-3 is formed for common use. And further, the first convex lens 2, the second convex lens 4 and the third convex lenses 6-1 and 6-2 constituting each of the wavelength-selective optical switches 8-1 to 8-3 are formed as the first light control element 2A, the second light control element 4A and the third light control elements 6A-1 and 6A-2, which are formed integrally respectively for common use. Accordingly, compared to the case where three wavelength-selective optical switches, in which each of the constituent elements are separated from each other, are employed, the number of parts as the spectroscopy section 3A, the first light control element 2A, the second light control element 4A and the third light control elements 6A-1 and 6A-2 is reduced as the whole. As a result, such an effect that the cost for parts is reduced can be obtained.

Further, the first to third light control elements 2A, 4A, 6A-1, 6A-2 are arranged such that each of the light beams outputted from the first ports 1-1 to 1-3 or the second ports 7-11 to 7-13 and 7-21 to 7-23 constituting the three wavelength-selective optical switches 8-1 to 8-3, which are disposed being piled up, pass through substantially the same point in the spectroscopy section 3A; and so that the reflected beams reflected by the reflectors 5-1 to 5-3 also pass through the above-mentioned same point in the spectroscopy section 3A so as to be inputted to the first ports 1-1 to 1-3 or the second ports 7-11 to 7-13 and 7-21 to 7-23. Accordingly, the size of the spectroscopy section 3A (particularly, the size in the vertical direction in FIG. 6) is the same size as that in the case where a single wavelength-selective optical switch is formed. Accordingly, such effect that the size of the member can be largely reduced is obtained.

For example, when a convex lens with a focal length of 48 mm is used for the first light control element 2A and the third light control elements 6A-1 and 6A-2, and when a convex lens of a focal length of 150 mm is used for the second light control element 4A, the dimension in the height direction of the diffraction grating of the spectroscopy section 3A can be reduced to 10 mm or less. Further, when the distance between the first ports 1-1 to 1-3 and the second port 7-11 to 7-13 and 7-21 to 7-23 is set to 250 μm, in the case where the number of ports in the vertical direction is three as shown in FIG. 1, the height of the port section can be reduced to 625 μm. Even when the number of ports in the vertical direction is increased to 40, the height of the port section can be reduced to 10.125 mm. Such effect that a thin device can be formed is obtained.

Furthermore, since the distance among the first port 1-1 to 1-3 and the second port 7-11 to 7-13 and 7-21 to 7-23 can be made smaller, such effect that a small size device can be formed is obtained.

Furthermore, the device can be manufactured while collectively positioning or aligning the first light control element 2A, the spectroscopy section 3A, the second light control element 4A, the third light control elements 6A-1 and 6A-2 and the reflectors 5-1 to 5-3, which are equivalent to a plurality of the wavelength-selective optical switches, as a set. Accordingly, compared to the case where pluralities of separate wavelength-selective optical switches are used, such effect that the assembling manhours and the assembling cost can be largely reduced is obtained.

Figure 21:
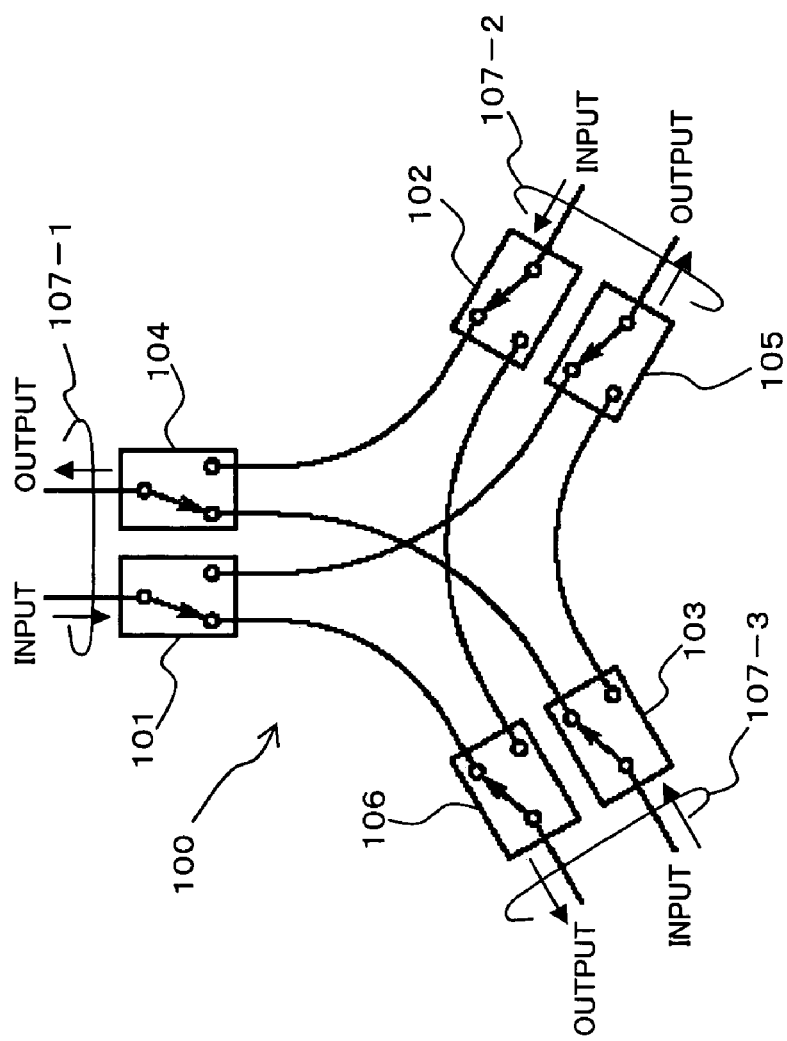
FIG. 21 is a diagram showing an example of an ordinary M×M (M=3) wavelength-selective optical switch.

The above effects will be described below in particular. For example, in the case where an M×M (M=3) wavelength-selective optical switch 100 as shown in FIG. 21 is formed, a plurality of wavelength-selective optical switches 8 shown in FIG. 2 (6 switches in this case) is required. As described above, in the case where plural wavelength-selective optical switches 8 shown in FIG. 2 are required, it is readily conceivable that these plural wavelength-selective optical switches 8 are simply assembled and pile up into one.

Figure 7:
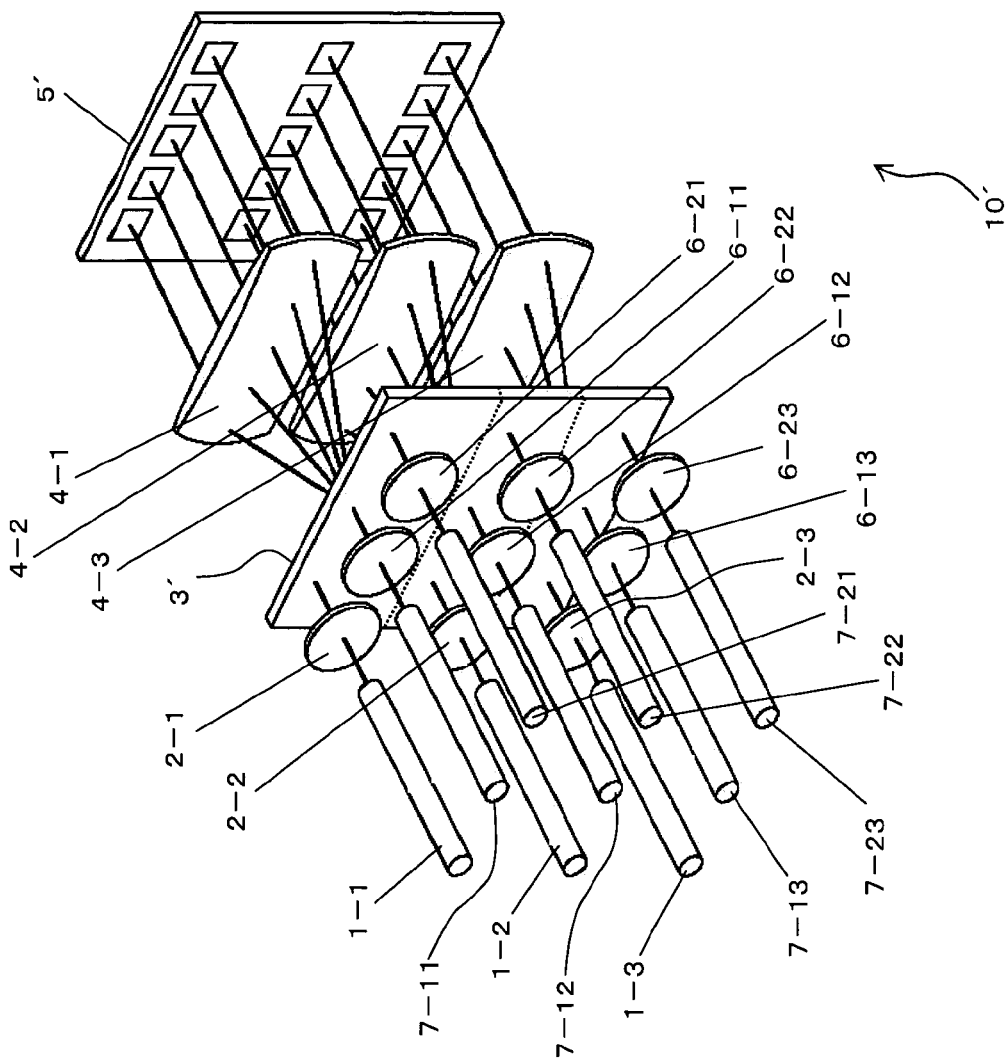
FIG. 7 is a perspective view schematically showing an example of an optical switching device constituted with assembled wavelength-selective optical switches shown in FIG. 2.

For instance, FIG. 7 shows an example in which three of wavelength-selective optical switches 8 are assembled and simply piled up to form an optical switching device 10'. In the optical switching device 10' shown in FIG. 7, three of convex lenses as the first light control elements 2-1 to 2-3 are required; three of convex lenses as the second light control elements 4-1 to 4-3 and six of convex lenses 6-11 to 6-13 and 6-21 to 6-23 as the third light control elements are required. In FIG. 7, reference numeral 3' denotes a diffraction grating as the integrally formed spectroscopy section and 5' denotes an MEMS mirror array in which reflectors 5-1 to 5-3 are integrated with each other.

On the other hand, in the optical switching device 10 according to the first embodiment, as shown in FIG. 1, a single convex lens serves as the first light control element 2A; also a single convex lens serves as the second light control element 4A and two convex lenses serve as the third light control elements 6A-1 and 6A-2. Accordingly, the number of the component parts for the lenses can be reduced to ⅓.

Figure 8:
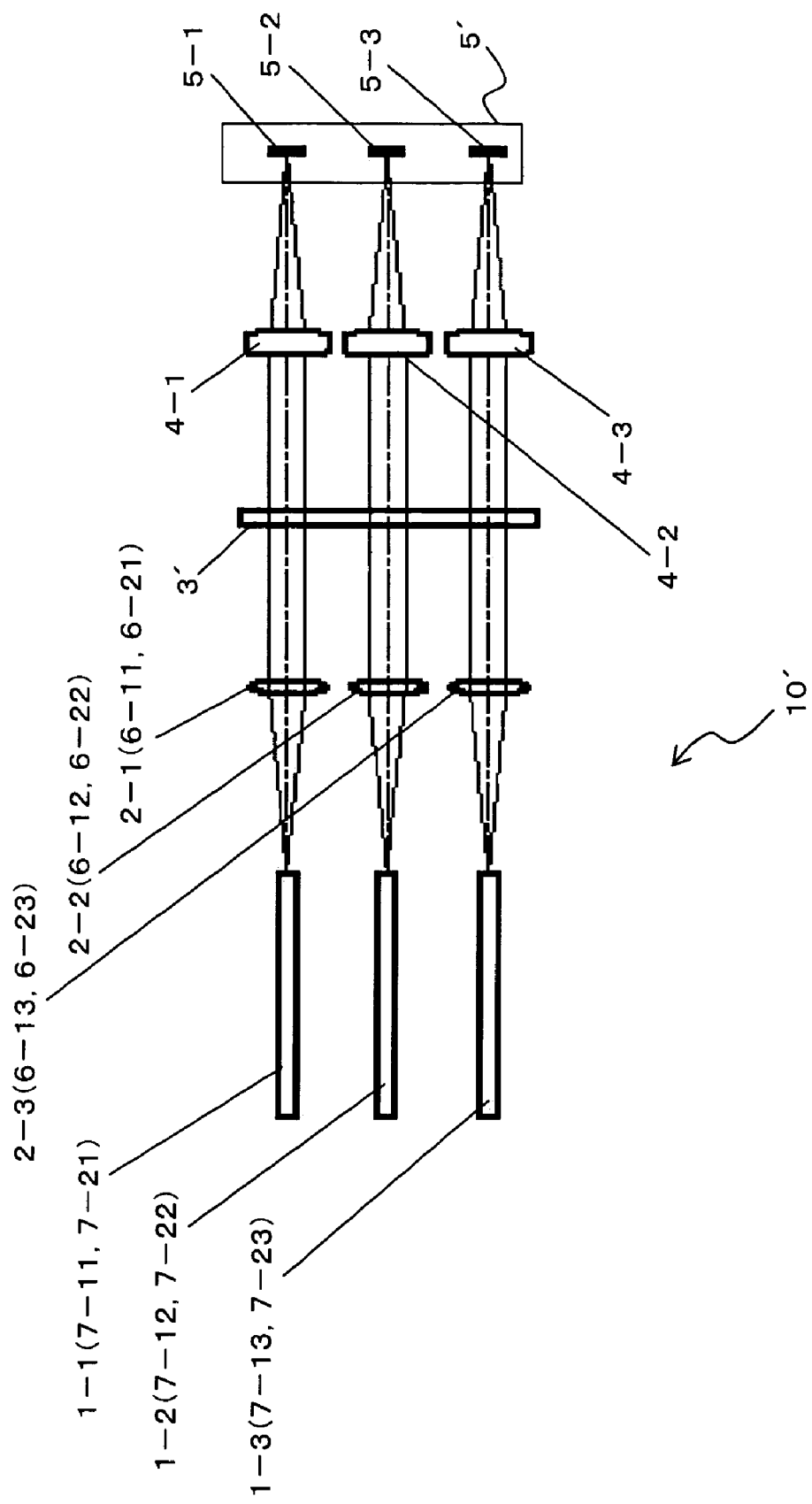
FIG. 8 is a schematic front view of the optical switching device shown in FIG. 7.

FIG. 8 is a schematic front view of the above optical switching device 10' shown in FIG. 7. Comparing the optical switching device 10' shown in FIG. 8 to the optical switching device 10 according to the first embodiment shown in FIG. 6, in the constitution of the optical switching device 10' shown in FIG. 8, each of the first light control elements 2-1 to 2-3 or the second light control elements 4-1 to 4-3 has to be formed relatively large in size. Accordingly, it is difficult to reduce the distance between the first ports 1-1 to 1-3 (or between the second ports 7-11 to 7-13, between the second ports 7-21 to 7-23) and the distance between the reflectors 5-1 to 5-3 constituting the MEMS mirror 5'.

On the other hand, in the optical switching device 10 according to the first embodiment, as show in FIG. 6, the distance between the first ports 1-1 to 1-3 (or between the second ports 7-11 to 7-13 and between the second ports 7-21 to 7-23) and the distance between the elements of the reflectors 5-1 to 5-3 can be matched with a larger pitch in the ports 1-1 to 1-3 (7-11 to 7-13, 7-21 to 7-23) and the reflectors 5-1 to 5-3. In the case of the first embodiment, by employing an optical fiber for the ports 1-1 to 1-3 (7-11 to 7-13 and 7-21 to 7-23), and by employing an MEMS mirror array 5A for the reflectors 5-1 to 5-3, the distance between the ports and the distance between the elements (mirrors 5a) on the reflectors 5-1 to 5-3 can be matched to the outer size (usually, 250 micron) of the optical fiber. Accordingly, such an effect that the device can be formed smaller in size is obtained.

Further, comparing a side view of the optical switching device 10' shown in FIG. 8 to FIG. 6, the size of the spectroscopy section 3A can be largely reduced in the vertical direction in the figure. Accordingly, the cost for part for the spectroscopy section can be largely reduced.

Further, in the above optical switching device 10' shown in FIGS. 7 and 8, with respect to each of the three wavelength-selective optical switches 8, the positioning of the first ports 1-1 to 1-3, the first light control elements 2-1 to 2-3, the spectroscopy section 3', the second light control elements 4-1 to 4-3, the reflectors 5-1 to 5-3, the third light control elements 6-11 to 6-13 and 6-21 to 6-23 and the second ports 7-11 to 7-13 and 7-21 to 7-23 have to be carried out while assembling and manufacturing the device.

On the other hand, in the optical switching device 10 according to the first embodiment, for example, by using arrayed ports formed of optical fibers, which are disposed and fixed in a state of array, for the first ports 1-1 to 1-3 and the second ports 7-11 to 7-13 and 7-21 to 7-23, the optical switching device 10 can be assembled and manufactured with the members necessary for forming the device, which are positioned only once. Accordingly, the manufacturing steps can be also largely reduced.

In the above-described first embodiment, the optical switching device 10, which includes three optical switching devices 8 shown in FIG. 2, has been described in detail. However, the present invention is not limited to the above. According to the present invention, the above-described advantages can be obtained when a plurality of optical switching devices are disposed being piled up so that N functions as the optical switching device 8 shown in FIG. 2 (N is 2 or 4 or more) are provided.

In the case where the present invention is not employed, for example, and when an optical switching device having six functions as the optical switching device 8 shown in FIG. 2 is formed in the same manner as the above shown in FIG. 7, for example, six convex lenses as the first light control elements; for example, six diffraction gratings as the spectroscopy section; for example, six convex lenses as the second light control elements; and for example, twelve convex lenses as the third light control elements are required. On the other hand, when the optical switching device according to the present invention is configured, the number of the convex lens necessary for the first light control element, the second light control element, and the third light control element can be reduced to ⅙ respectively. Further, as for the size and the number of the spectroscopy sections also, only one spectroscopy section, which is the same size as that used for forming one 1×2 wavelength-selective optical switch is used. Accordingly, the cost for component parts can be largely reduced.

Figure 22:
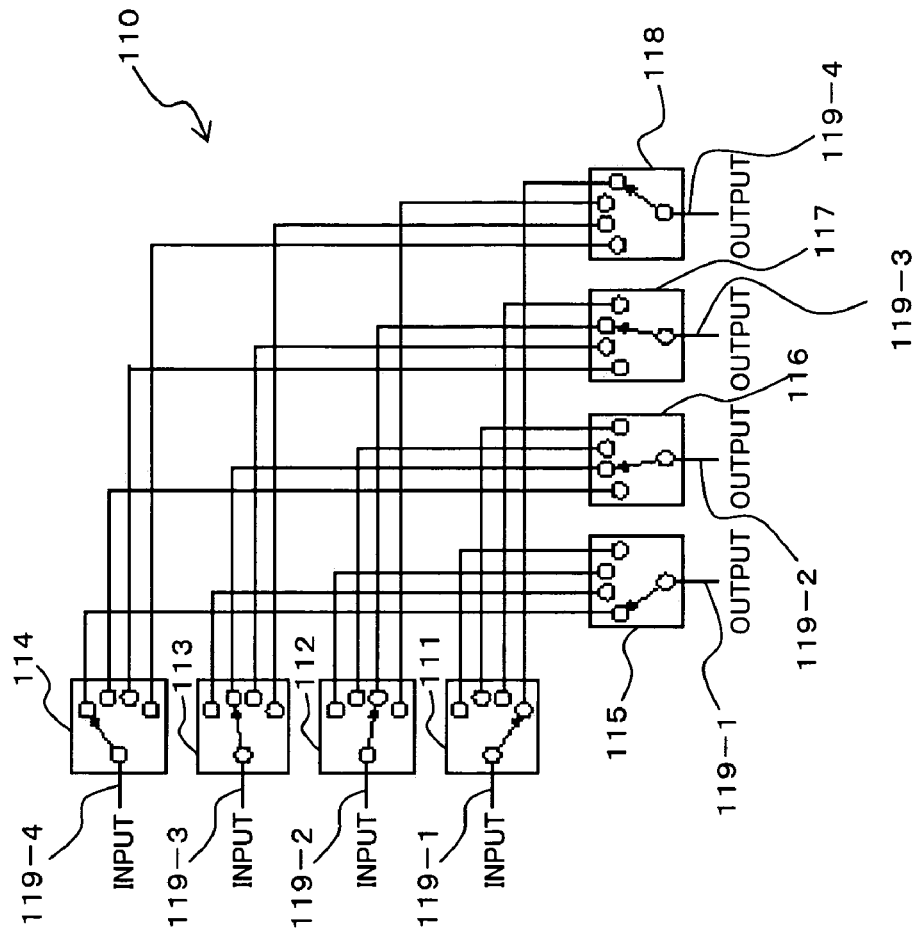
FIG. 22 is also a diagram showing an example of an ordinary M×M (M=4) wavelength-selective optical switch.

In the case where the number of the 1×N wavelength-selective switches incorporated in one device is further larger, a further larger effect can be obtained. For example, when a device 110 shown in FIG. 22 is formed, eight 1×N (N=4) wavelength-selective switches are required. Accordingly, such an effect that the cost for component parts for the lenses can be reduced to ⅛is obtained.

[B] Description of Second Embodiment

Figure 9:
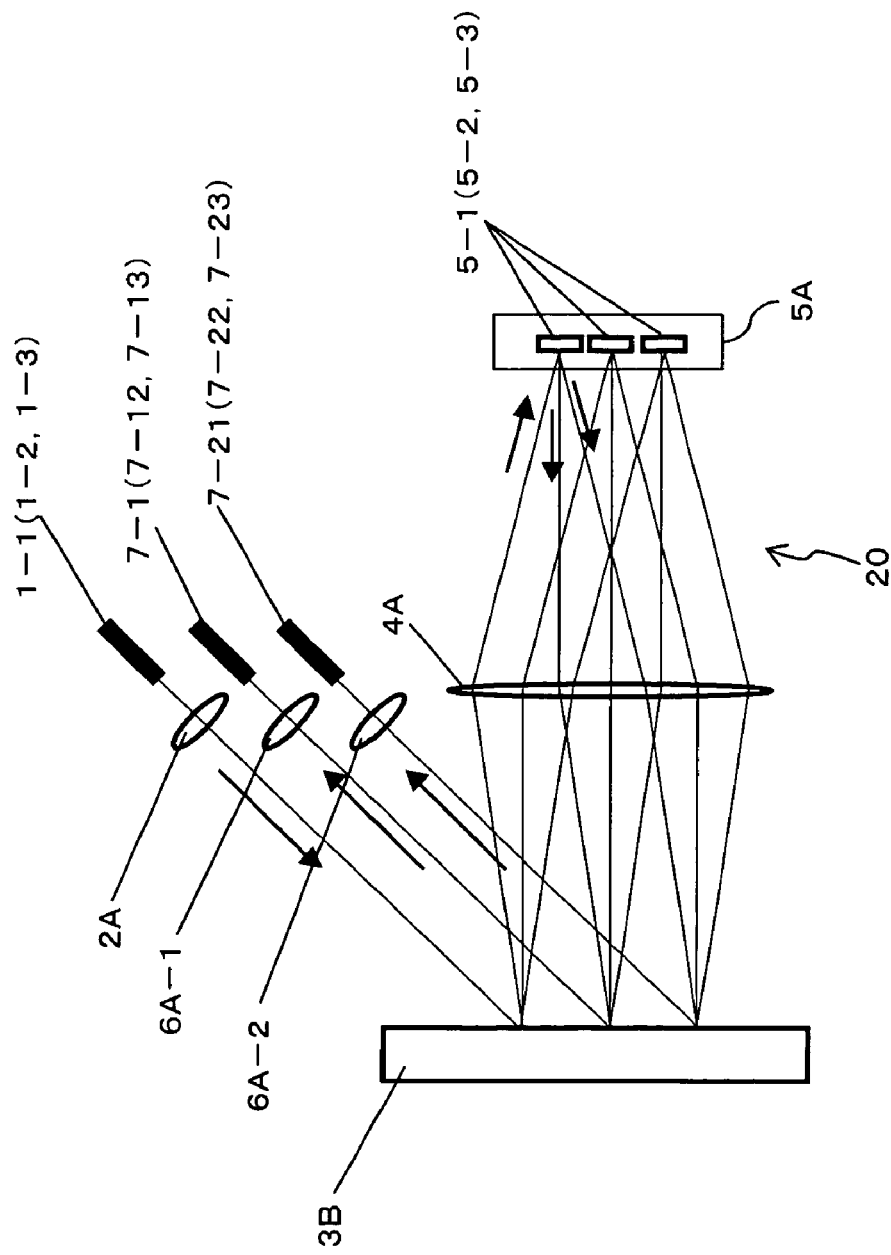
FIG. 9 is a top view schematically showing an optical switching device according to a second embodiment of the present invention.

FIG. 9 is a top view schematically showing an optical switching device 20 according to a second embodiment of the present invention. The optical switching device 20 shown in FIG. 9 is different from the optical switching device 10 according to the first embodiment in the following points. That is, compared to the above-described first embodiment (refer to reference numeral 10), a reflective diffraction grating in the shape of a parallel plate is employed as a spectroscopy section 3B. And in accordance with this, the disposition of the first, second ports 1-1 to 1-3, 7-11 to 7-13 and 7-21 to 7-23, and first and third light control elements 2A, 6A-1 and 6A-2 on the light paths are different. Basically, the points other than the above mentioned different points have the same constitution as that of the optical switching device 10 according to the first embodiment. In FIG. 9, the same reference numerals as those in FIG. 1 show substantially the identical parts.

The reflective diffraction grating in the shape of a parallel plate as the spectroscopy section 3B reflects the light beams, which are inputted through the convex lenses as the above-described first light control element 2A or third light control elements 6A-1 and 6A-2. It is arranged such that the light beams are reflected at reflection angles different from each other depending on the wavelength to enter a convex lens as the second light control element 4A. Likewise, the reflective diffraction grating in the shape of a parallel plate as the spectroscopy section 3B reflects the reflected beams, which are reflected by the reflector 5-1 to 5-3 and enters through the second light control element 4A. It is arranged such that the reflected beams are reflected at reflection angles different from each other depending on the wavelength and enter a convex lens as the third light control elements 6A-1, 6A-2 or the first light control element 2A, which are the output targets.

In the optical switching device 20 structured as described above, the spectroscopy section 3A of the wavelength-selective optical switch 8-1 is formed for common use. Further, the first convex lens 2, the second convex lens 4 and the third convex lens 6-1 and 6-2 comprising wavelength-selective optical switches 8-1 to 8-3 are formed as the first light control element 2A, the second light control element 4A and the third light control elements 6A-1 and 6A-2, which are integrally formed for common use. Accordingly, the same advantages as those in the case of the above-described first embodiment are obtained.

Further, the dispersion of the reflective diffraction grating constituting the spectroscopy section 3B is expressed by the same formula (1) as the above-described transmissive diffraction grating. For example, when a convex lens with focal length of 48 mm is used for the first light control element 2A and the third light control elements 6A-1 and 6A-2; and a convex lens with focal length of 150 mm is used for a second light control element 4A, at the frequency intervals of the WDM light is 100 GHz, the channel intervals at the focal point (on the MEMS mirror) is 100 λm, and the spot diameter of the condensed beam (radius) is 16 μm. Accordingly, a wavelength-selective optical switch having a flattop transmissive characteristic can be achieved.

Here, the dimension in the height direction of the diffraction grating can be reduced to 10 mm or less. Further, when the distance among the first ports 1-1 to 1-3 and the second ports 7-11 to 7-13 and 7-21 to 7-23 is set to 250 μm, in the case where the number of the ports in the vertical direction is three as shown in FIG. 1 and when the height of the port section is set to 625 μm, and the number of ports in the vertical direction is set to 40, the height of the port section can be reduced to 10.125 mm.

[C] Description of Third Embodiment

[C-1] Constitution of Optical Switching Device 30 According to Third Embodiment

Figure 10:
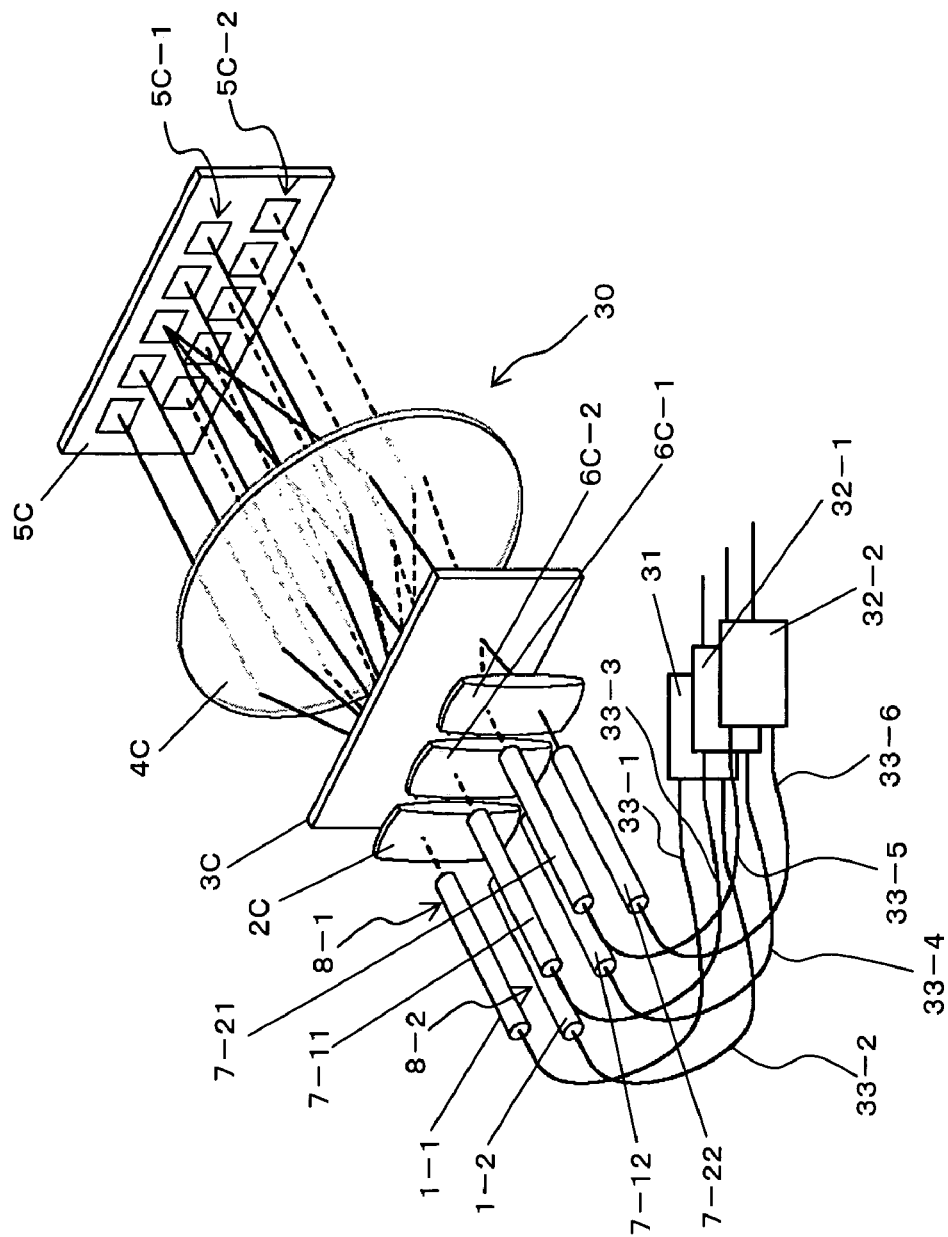
FIG. 10 is a perspective view schematically showing an optical switching device according to a third embodiment of the present invention.

FIG. 10 is a perspective view schematically showing an optical switching device 30 according to a third embodiment of the present invention. Compared to the optical switching device 10 according to the above-described first embodiment, the optical switching device 30 shown in FIG. 10 comprises a first convex lens 2C, a spectroscopy section 3C, a second convex lens 4C, a reflector 5C and third convex lenses 6C-1 and 6C-2, which correspond to those in the optical switching device 10. But, the optical switching device 30 is formed of not three but two of 1×2 (2×1) wavelength-selective optical switches 8-1 and 8-2 being pile up. Also, a first PSD (physical status dependent) light separating/combining section 31 is optically connected to the first ports 1-1 and 1-2 constituting each of the wavelength-selective optical switches 8-1 and 8-2. A second PSD light separating/combining section 32-1 is optically connected to the second ports 7-11, 7-12 constituting the wavelength-selective optical switches 8-1 and 8-2; and a second PSD light separating/combining section 32-2 is optically connected to the second ports 7-21 and 7-22 constituting the wavelength-selective optical switches 8-1 and 8-2 respectively.

Figure 11:
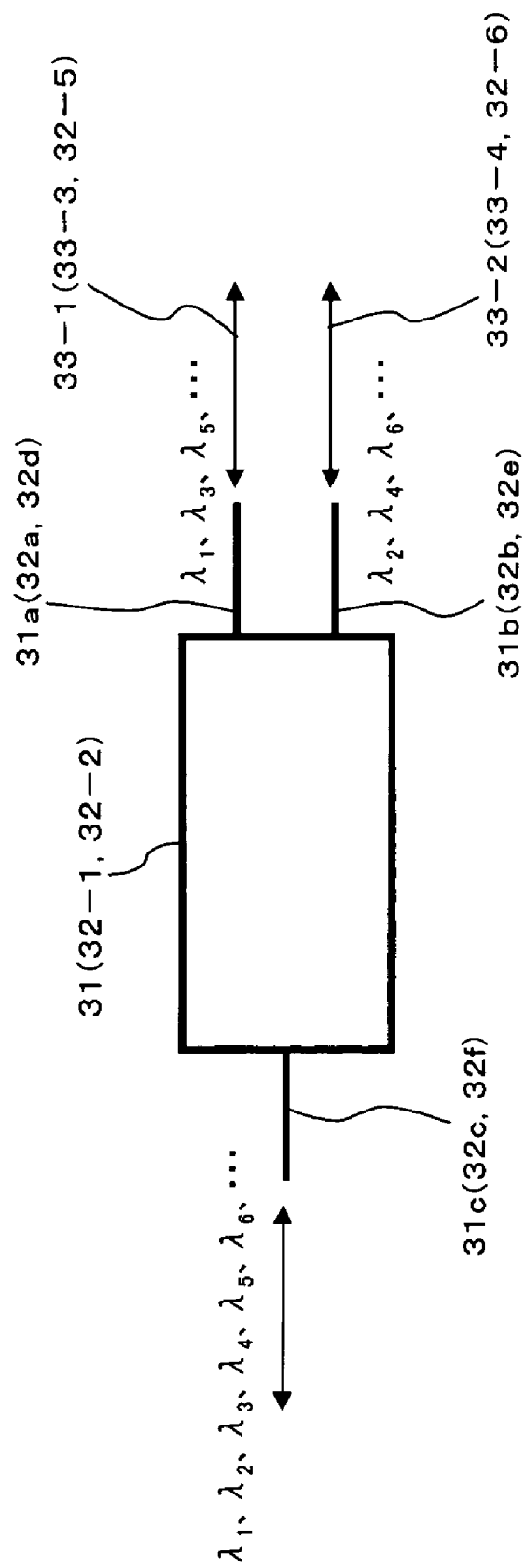
FIG. 11 is a diagram showing a first/second PSD light separating/combining section according to the third embodiment of the present invention.

Each of the first and second PSD light separating/combining sections 31, 32-1 and 32-2 separates or combines the light corresponding to the physical status of the light. As shown in FIG. 11, the first PSD light separating/combining section 31 is provided with, for example, ports 31*a*, 31*b* and 31*c*. The ports 31*a* and 31*b* are connected to the first ports 1-1 and 1-2 in the wavelength-selective optical switches 8-1 and 8-2 via the optical connecting elements 33-1 and 33-2. And the port 31*c* is provided at the opposite side of the ports 31*a* and 31*b*.

Likewise, the second PSD light separating/combining section 32-1 is provided with the ports 32*a*, 32*b* and 32*c*. The ports 32*a* and 32*b* are connected respectively to the second ports 7-11 and 7-12 in the wavelength-selective optical switches 8-1 and 8-2 via the optical connecting element 33-3 and 33-4. The port 32*c* is provided at the opposite side of the ports 32*a* and 32*b*. Further, the second PSD light separating/combining section 32-2 is provided with ports 32*d*, 32*e* and 32*f*. The ports 32*d* and 32*e* are connected to the second ports 7-21 and 7-22 in the wavelength-selective optical switches 8-1 and 8-2 respectively via optical connecting elements 33-5 and 33-6. The port 32*f* is provided at the opposite side of the ports 32*d* and 32*e*. As for the above-mentioned optical connecting elements 33-1 to 33-6, for example, an optical fiber may be used.

As shown in FIG. 11, the first and second PSD light separating/combining sections 31, 32-1 and 32-2 is adapted so as to separate or combine the input light signal corresponding to, as the physical status of the input light signal, for example, the light wavelength. Here, in the first, second PSD light separating/combining sections 31, 32-1 and 32-2, it is possible to separate the input light signal to the output targets in order based on predetermined intervals of the light wavelength (for example, at the intervals of the neighboring wavelength channels).

For example, it is adapted so that WDM light (wavelength $\lambda_k$: k is a number given based on the wavelength arrangement of multiplexed light signal, k=1, 2, . . . ), which is inputted from the port 31*c* (32*c*, 32*f*), can be outputted one after another based on the neighboring wavelength channel through the ports 31*a* and 31*b* (32*a*, 32*b*, 32*d*, 32*e*). In particular, the light signals of wavelength $\lambda_1, \lambda_3, \lambda_5, \ldots$ can be outputted through the port 31*a* as well as the light signals of wavelength $\lambda_2, \lambda_4, \lambda_6, \ldots$ can be outputted through the port 31*b*. Or, the light signals of wavelength $\lambda_1, \lambda_3, \lambda_5, \ldots$, which are inputted through the port 31*a*, and the light signals of wavelength $\lambda_2, \lambda_4, \lambda_6, \ldots$ which are inputted through the port 31*b*, can be combined into the WDM light of wavelength $\lambda_k$ (k=1, 2, . . . ) and outputted through the port 31*c*.

Thus, it is adapted so that the light separated by the first PSD light separating/combining section 31 is outputted to the first convex lens 2C as the first light control element through the first ports 1-1 and 1-2, which are different from each other; and it is arranged such that the beams of the light outputted from the second ports 7-11, 7-12, 7-21, 7-22 to the second PSD light separating/combining sections 32-1, 32-2 are combined (in this case, wavelength multiplex) by the second PSD light separating/combining section 32-1, 32-2.

Further, the light in the inversed direction of the above case; i.e., the light, which is inputted through the ports 32*c* and 32*f* of the second PSD light separating/combining sections 32-1 and 32-2, is separated in the second PSD light separating/combining sections 32-1 and 32-2 (in this case, wavelength separation). The separated light beams are outputted to the third convex lenses 6C-1 and 6C-2 as the third light control elements through the second ports 7-11, 7-12, 7-21 and 7-22, which are different from each other. The light beams (light reflected by the reflectors 5-1 and 5-2), which are outputted from the first ports 1-1 and 1-2 to the first PSD light separating/combining section 31, are combined (wavelength multiplex) by the first PSD light separating/combining section 31, and outputted from port 31*c*.

Figure 12:
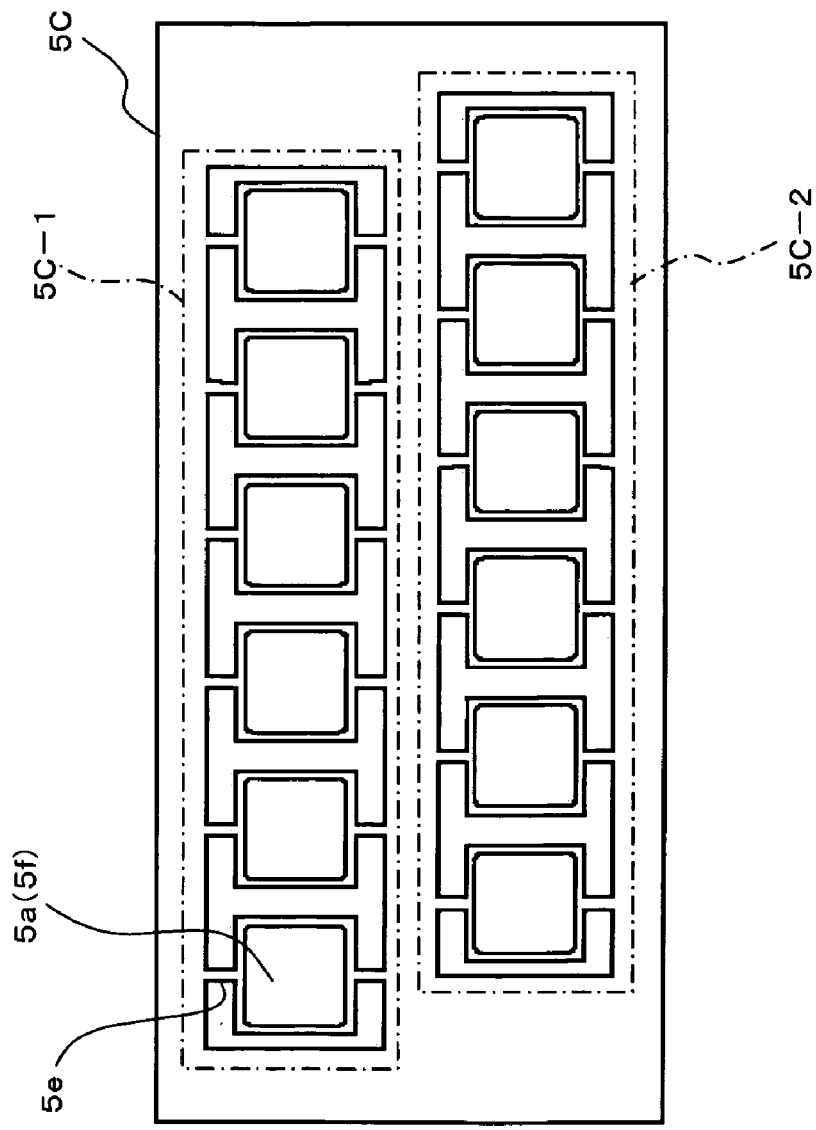
FIG. 12 is diagram schematically showing an example of an essential part of an MEMS mirror array according to the third embodiment of the present invention.

Further, the reflectors 5C-1 and 5C-2 of the optical switching device 30 according to the third embodiment may be formed integrally as the MEMS mirror array 5C. In the optical switching device 30 according to the third embodiment, with the first, second PSD light separating/combining sections 31, 32-1 and 32-2, the neighboring wavelength channels are imparted or distributed to the wavelength-selective optical switches 8-1 and 8-2 alternately. Accordingly, the refraction angles of the light beams after being separated by the spectroscopy section 3C are displaced each other in a zigzag manner. Therefore, the disposition of the mirrors 5*a* in each of the reflectors 5C-1 and 5C-2 is arranged in a, for example, zigzag manner as shown in FIG. 12. With this, the light beams, which are inputted to the wavelength-selective optical switches 8-1 and 8-2 based on the wavelength, can be reflected at a high efficiency.

In the above case, the mirrors are preferably arranged in a zigzag manner as described below. That is, the central axes (along the direction of the hinge portions 5*e* formed to support the respective rotating portions 5*f*) of the mirrors 5*a* at the upper side (reflector 5C-1) and the lower side (reflector 5C-2) in FIG. 12, are disposed at the same intervals; and at the center between the central axes of the mirrors 5*a* in the other reflectors (for example, reflector 5C-2), the central axes of the mirrors 5*a* in the own reflectors (for example, reflectors 5C-1) are disposed.

Figure 13:
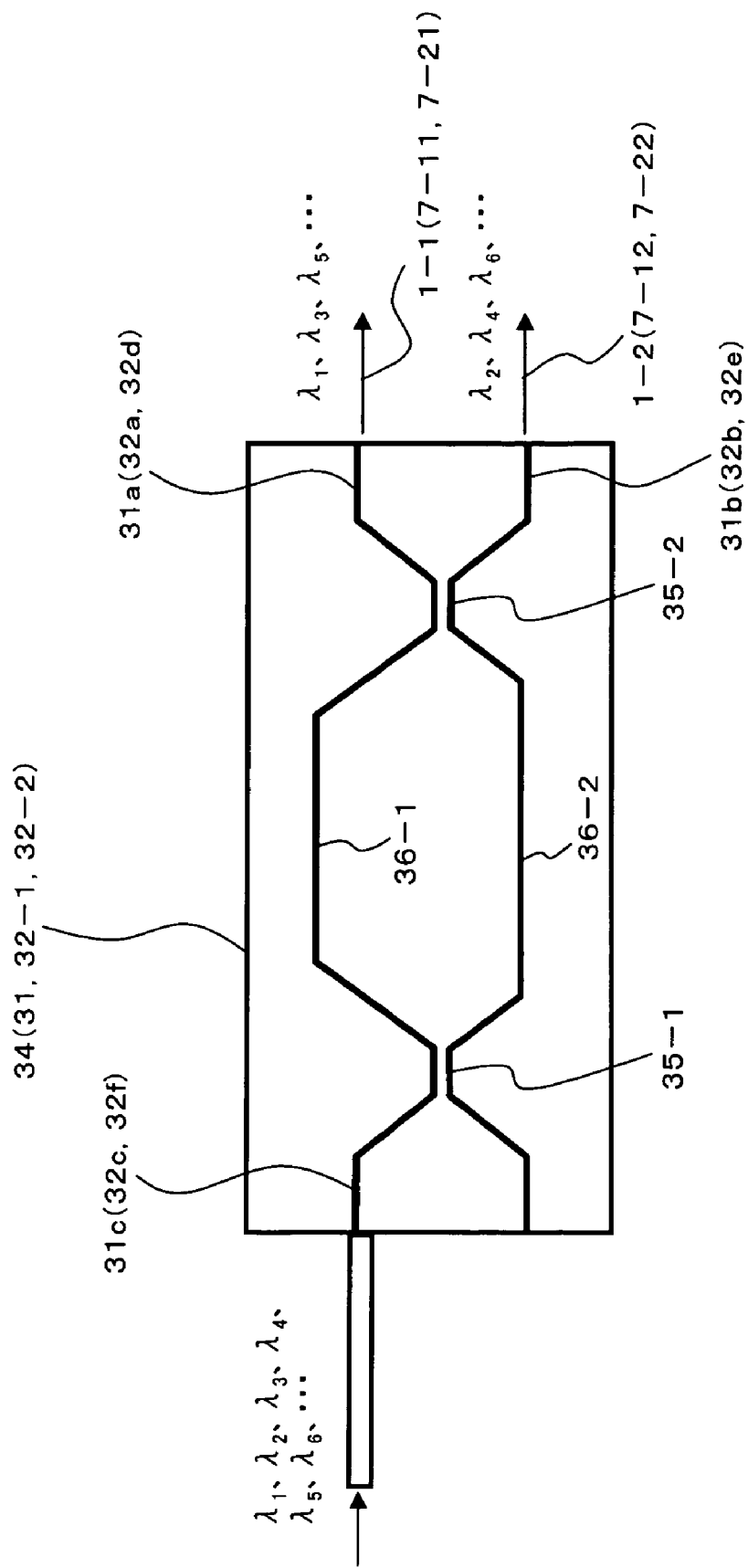
FIG. 13 is a diagram showing a first/second PSD light separating/combining section according to the third embodiment of the present invention.

Further, the above-described first and second PSD light separating/combining sections 31, 32-1 and 32-2 may be formed of, for example, a light waveguide device 34 respectively each constituting a Mach-Zehnder interferometer, as shown in FIG. 13. In the light waveguide device 34 shown in FIG. 13, the length of the light paths 36-1 and 36-2 between the 3 dB couplers 35-1 and 35-2 is different from each other. With this, it is adapted so that the light inputted to the port 31*c* (32*c*, 32*f*) is imparted or distributed alternately to the two ports 31*a* (32*a*, 32*d*) and 31*b* (32*b*, 32*e*) at predetermined intervals of optical frequency.

With this, by connecting to the optical fibers as the first ports 1-1 and 1-2 or the second port 7-11, 7-12, 7-21 and 7-22, the first PSD light separating/combining section 31 and the second PSD light separating/combining section 32-1 and 32-2 can be readily incorporated integrally into the optical switching device 30; thus the entire device can be formed smaller in size. As for the above-described first and second PSD light separating/combining sections 31, 32-1 and 32-2, in addition to the one shown in FIG. 13, a PSD light separating/combining section in which a plurality of Mach-Zehnder interferometer are connected to each other in a ladder configuration (ladder connection) may be used.

[C-2] Operation and Effect of the Optical Switching Device 30 According to the Third Embodiment With the above described constitution, in the optical switching device 30 according to the third embodiment, when the wavelength-selective optical switches 8-1 and 8-2 are used to operate as the 1×2 wavelength-selective optical switches, the inputted WDM light can be switched over to these switches 8-1 and 8-2 being imparted or distributed to the upper portion and the lower portion alternately based on the neighboring wavelength channels. In this case, in the first PSD light separating/combining section 31, the inputted WDM light is outputted being imparted or distributed to the two first ports 1-1 and 1-2 based on the neighboring wavelength channels.

Further, when the wavelength-selective optical switches 8-1 and 8-2 are used to operate as the 2×1 wavelength-selective optical switches, the input WDM light beams can be switched over to these switches 8-1 and 8-2 being imparted or distributed alternately to the upper portion and the lower portion based on the neighboring wavelength channels. In this case, in the second PSD light separating/combining sections 32-1 and 32-2 also, the inputted WDM light can be outputted to the second ports 7-11, 7-12, 7-21 and 7-22 being imparted or distributed based on the neighboring wavelength channels.

As described above, in the optical switching device 30 according to the third embodiment of the present invention, in the wavelength-selective optical switches 8-1 and 8-2 constituting the optical switching device 30, the first light control element 2C, the spectroscopy section 3C, the second light control element 4C, and the third light control elements 6C-1 and 6C-2 are shared with the wavelength-selective optical switches 8-1 and 8-2; and the first and second PSD light separating/combining sections 31, 32-1 and 32-2 are provided thereto. With this, in addition to the same advantages as those in the case of the above described first embodiment, by integrally forming the reflectors 5C-1 and 5C-2 with the MEMS mirror 5C, the optical switching device 30 in which each of the light beams having different physical status can be switched over independently to the respective paths based on the wavelength. Compared to the case where plural separate wavelength-selective switches are combined to each other, such an effect that the optical switching device 30 can be formed smaller in size and inexpensive is obtained.

Further, in each of the two light beams, which are separated to the upper portion and the lower portion by the first or second PSD light separating/combining section 31, 32-1 and 32-2, (wavelength intervals of the neighboring beams of the upper part only or the lower part only in the separated upper and lower groups), the wavelength intervals of the WDM channel included in the beam is expanded two times as wide as the wavelength intervals of the WDM channel included in the light inputted to the first PSD light separating/combining section 31. Accordingly, for example, in the case where the intervals between the elements (mirrors 5a) in the reflectors 5C-1 and 5C-2 is set to a specific value, by reducing the wavelength intervals of the WDM light included in the input light to the first PSD light separating/combining section 31 to ½ to increase the number of the multiplexing of the wavelength. Thus, such an effect that the capacity of communication can be increased is obtained.

Further, in the case the wavelength intervals of the WDM light included in the input light to the first PSD light separating/combining section 31 is used as they are, for example, the focal length of the second convex lens 4C as the second control element can be reduced to ½. Thus, such an effect that the device can be formed smaller in size is obtained. Or, the wavelength intervals of the WDM light included in the input light to the first PSD light separating/combining section 31 and the focal length of the lens, which is used for the second convex lens 4C as the second light control element, are set equal to each other; thereby, the intervals of the mirrors 5a and the width of the mirror 5a itself are expanded. Thus, such an effect that the waveband of the transitive waveband within the channels can be expanded and the flatness of the peak of the transmissive spectrum can be increased is obtained.

In the above-described third embodiment, the first and second PSD light separating/combining sections 31, 32-1 and 32-2 are adapted so that the inputted light beam is separated to two paths based on the wavelength, or the wavelengths of 2 inputted light beams are combined to output as 1 output. The present invention is not limited to the above. The first and second PSD light separating/combining sections 31, 32-1 and 32-2 may be adapted so that the inputted light beam is separated to three or more paths based on the wavelength, or the light beams inputted from three or more paths are combined based on the wavelength.

In the above case also, it may be adapted so that the light, which is separated by the first PSD light separating/combining section, is imparted or distributed to the first ports, which are optically connected thereto, in order at predetermined intervals as well as the light, which is separated by the second PSD light separating/combining section, is or distributed to the second ports, which are optically connected thereto, in order at predetermined intervals. And the MEMS mirror array constituting the reflectors also, in the same manner as that in the above-described third embodiment, the mirrors may be appropriately disposed in a zigzag manner.

[D] Description of Fourth Embodiment

Figure 14:
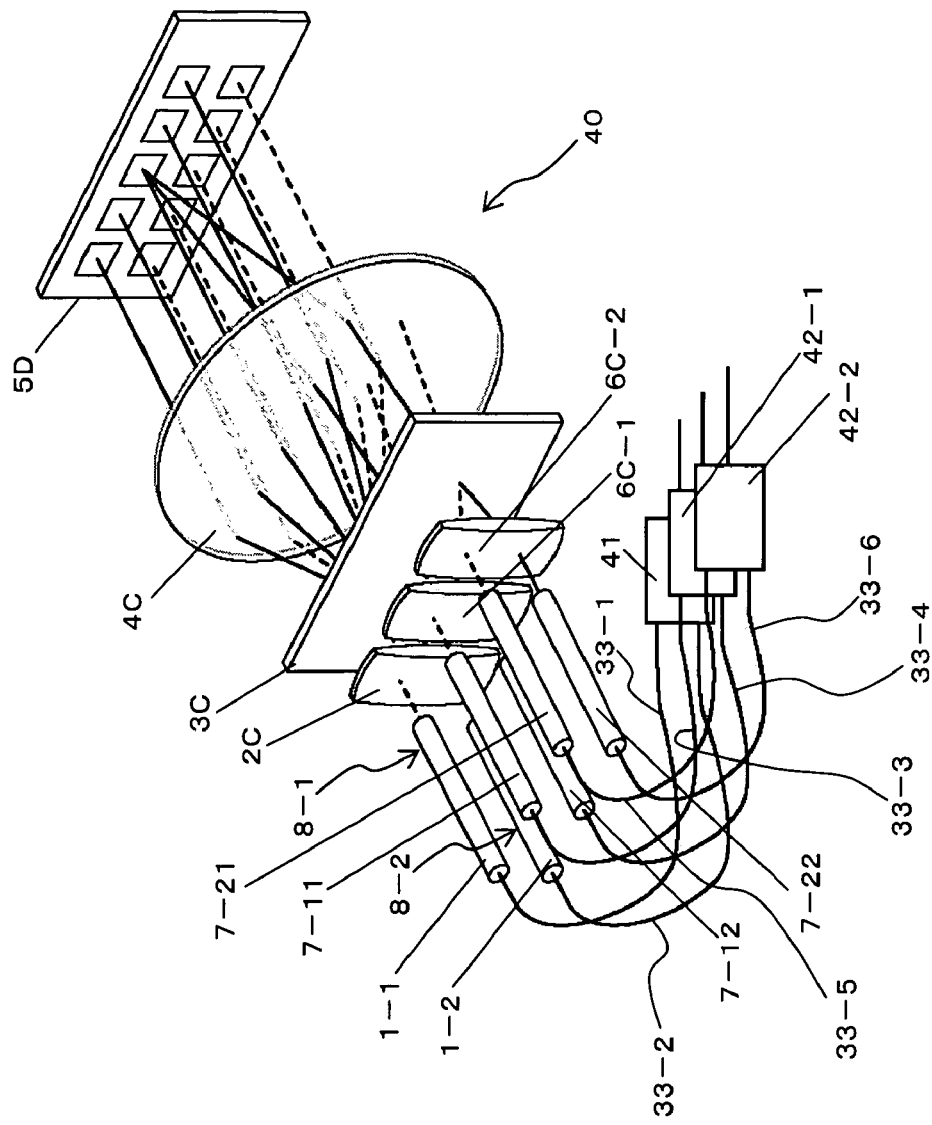
FIG. 14 is a perspective view schematically showing an optical switching device according to a fourth embodiment of the present invention.

[D-1] Constitution of Optical Switching Device 40 According to Fourth Embodiment FIG. 14 is a perspective view schematically showing an optical switching device 40 according to a fourth embodiment of the present invention. Compared to the optical switching device 30 in the above-described third embodiment, in the optical switching device 40 shown in FIG. 14, the first, second PSD light separating/combining sections 41, 42-1 and 42-2 are adapted so as to separate combine the light not based on the wavelength but based on the state of polarized wave. In FIG. 14, the same reference numerals as those in FIG. 10 denote the identical parts.

Figure 15:
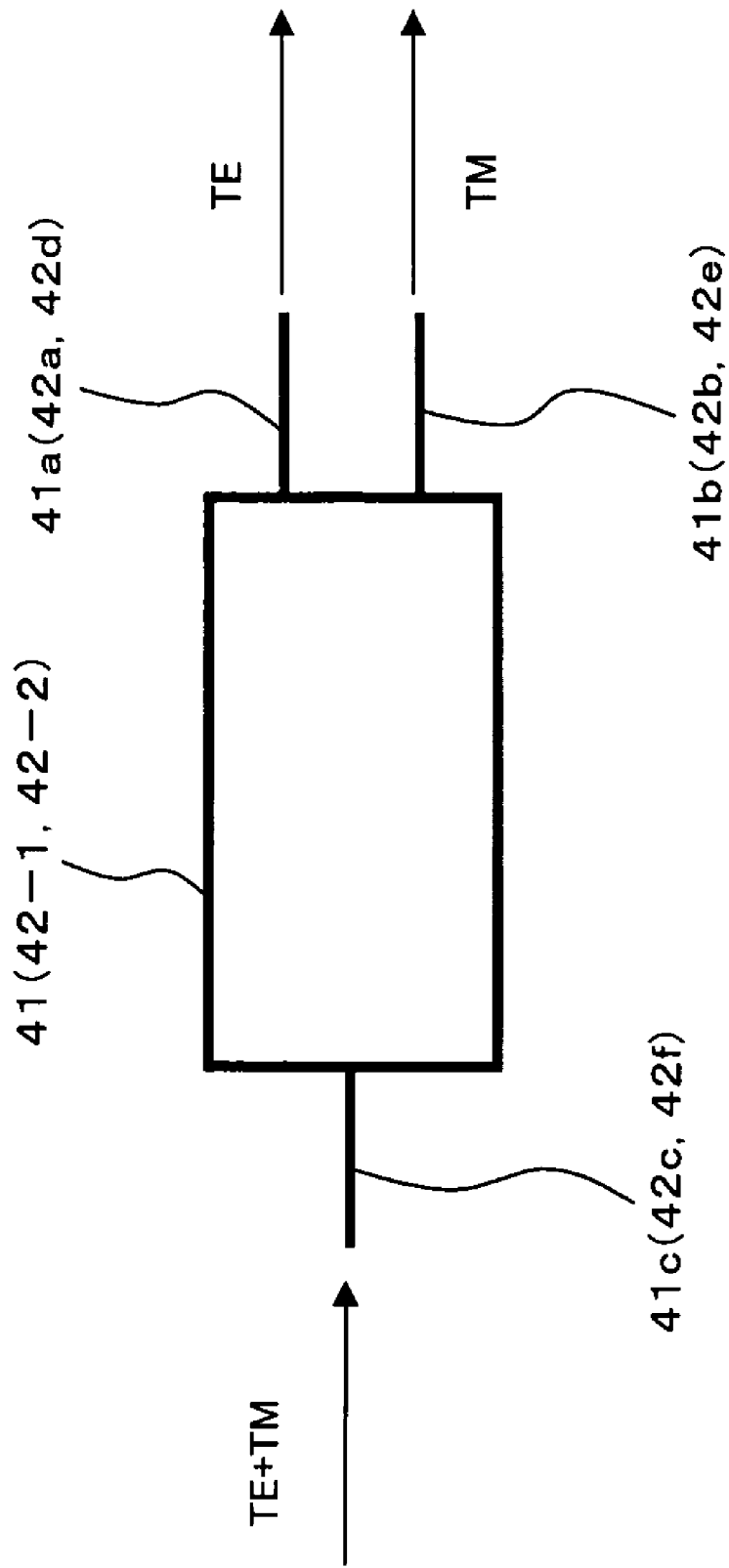
FIG. 15 is a diagram showing a first/second PSD light separating/combining section according to the fourth embodiment of the present invention.

For example, as shown in FIG. 15, the first PSD light separating/combining section 41 is provided with first ports 41a and 41b and port 41c. The first ports 41a and 41b are connected to the first ports 1-1 and 1-2 in the wavelength-selective optical switches 8-1 and 8-2 via optical connecting elements 33-1 and 33-2. The port 41c is provided at the opposite side of the ports 41a and 41b. The first PSD light separating/combining section 41 is arranged such that the light beam inputted from the port 41c is separated to TE component and TM component, which are the polarized components perpendicular to each other, and are outputted to the first ports 1-1 and 1-2 respectively through the ports 41a and 41b.

Likewise, the second PSD light separating/combining section 42-1 is provided with ports 42a and 42b and 42c. The ports 42a and 42b are connected to the second ports 7-11 and 7-12 in the wavelength-selective optical switches 8-1 and 8-2 via the optical connecting elements 33-3 and 33-4 respectively. The port 42c is provided at the opposite side of the ports 42a and 42b. The second PSD light separating/combining section 42-1 is adapted so as to combine the TE polarized wave and TM polarized wave, which are inputted from the ports 42a and 42b and to output the waves through the port 42c.

Further, the second PSD light separating/combining section 42-21 is provided with ports 42d and 42e and 42f. The ports 42d and 42e are connected to the second ports 7-21 and 7-22 in the wavelength-selective optical switches 8-1 and 8-2 via the optical connecting elements 33-5 and 33-6 respectively. The port 42f is provided at the opposite side of the ports 42d and 42e. The second PSD light separating/combining section 42-1 is adapted so as to combine the TE polarized wave and TM polarized wave, which are inputted from the ports 42d and 42e and to output the waves through the port 42f.

The reflectors 5D-1 and 5D-2 of the optical switching device 40 according to the fourth embodiment also may be formed integrally as an MEMS mirror array 5D. Different from the MEMS mirror array 5C according to the third embodiment, as for the disposition of the mirrors 5a in each of the reflectors 5D-1 and 5D-2, a gridiron arrangement may be employed in the same manner as the MEMS mirror array 5A in the above described first embodiment. That is, each of the wavelength-selective optical switches 8-1 and 8-2 handles the light beams, which are different from each other in polarized component but same in the wavelength. Unlike the case of the third embodiment, the zigzag mirror arrangement does not necessarily have to be employed.

Figure 16:
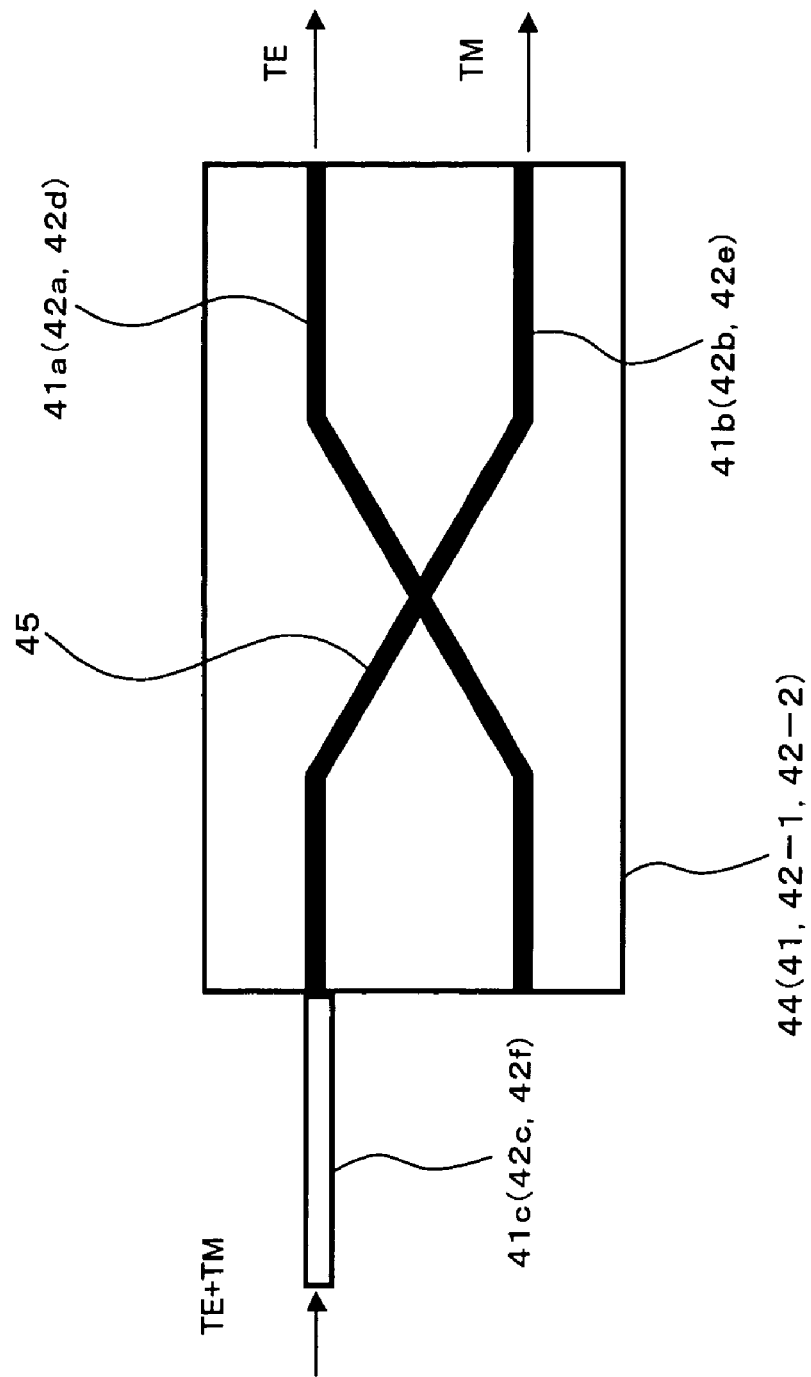
FIG. 16 is a diagram showing a first/second PSD light separating/combining section according to the fourth embodiment of the present invention.

Further, as for the first PSD light separating/combining section 41, as disclosed in, for example, Japanese Patent Laid-Open(Kokai) HEI 11-64809, for example, as shown in FIG. 16, a cross waveguide 45 is formed on a material which has a double refraction such as lithium niobate. Thereby, a light waveguide device 44, which separates the light inputted to a port 41c to polarized waves perpendicular to each other and outputs the polarized waves to two ports 41b and 41c. That is, the light waveguide device 44 is adapted so that, when a light beam with an arbitrary polarized wave enters the port 41c, the incident light is separated to linear polarized waves, which has two polarized waves (for example, TE light and TM light) perpendicular to each other, and the polarized waves are outputted from the two ports 41a and 41b as the output waveguides.

Likewise, the second PSD light separating/combining sections 42-1 and 42-2 also may be formed as the light waveguide device same as the above described first PSD light separating/combining section 41. The second PSD light separating/combining sections 42-1, 42-2 are adapted so that, in the polarized components outputted from the ports 7-11, 7-12, 7-21 and 7-22, the TE light is inputted through the ports 42a and 42d, and the TM light is inputted through the ports 42b and 42e; and these polarized components are combined and outputted through the ports 42c and 42f.

With this, the first PSD light separating/combining section 41 and the second PSD light separating/combining sections 42-1 and 42-2 can be readily incorporated integrally into the optical switching device 40; thus the entire device can be formed smaller in size.

[D-2] Operation and Effect of the Optical Switching Device 40 According to the Fourth Embodiment With the above-described constitution, in the optical switching device 40 according to the fourth embodiment, when the wavelength-selective optical switches 8-1 and 8-2 are used to operate as the 1×2 wavelength-selective optical switch, the inputted WDM light, which is separated to TM light and TE light, is switched over being imparted or distributed to the wavelength-selective optical switches 8-1 and 8-2. In this case, in the first PSD light separating/combining section 41, the inputted WDM light is outputted being imparted or distributed to the wavelength-selective optical switch 8-1 as the TE light, and to the wavelength-selective optical switch 8-2 as the TM light. And in each of the wavelength-selective optical switches 8-1 and 8-2, ordinary 1×2 optical switching is carried out based on the wavelength channel.

Also, when the wavelength-selective optical switches 8-1 and 8-2 are used to operate as a 2×1 wavelength-selective optical switch, with respect to the wavelength-selective optical switches 8-1 and 8-2, the inputted WDM light can be switched over while imparting the separated TM light and TE light to the switches 8-1 and 8-2. In this case, in the second PSD light separating/combining sections 42-1 and 42-2, the inputted WDM light is output being imparted or distributed to the wavelength-selective optical switch 8-1 as the TE light, and to the wavelength-selective optical switch 8-2 as the TM light respectively. And in each of the wavelength-selective optical switches 8-1 and 8-2, ordinary 2×1 optical switching is carried out based on the wavelength channel.

As described above, in the optical switching device 40 according to the fourth embodiment of the present invention, the wavelength-selective optical switches 8-1 and 8-2 constituting the optical switching device 30 share the first light control element 2C, the spectroscopy section 3C, the second light control element 4C, and the third light control elements 6C-1 and 6C-2 with each other, and further include the first, second PSD light separating/combining section 41, 42-1 and 42-2. Accordingly, in addition to the advantages same as the case of the above-described first embodiment, the following advantage is obtained. That is, the light path of the polarized and multiplexed WDM light can be selected individually based on the polarized waves perpendicular to each other and based on the wavelength.

[E] Description of Fifth Embodiment

Figure 17:
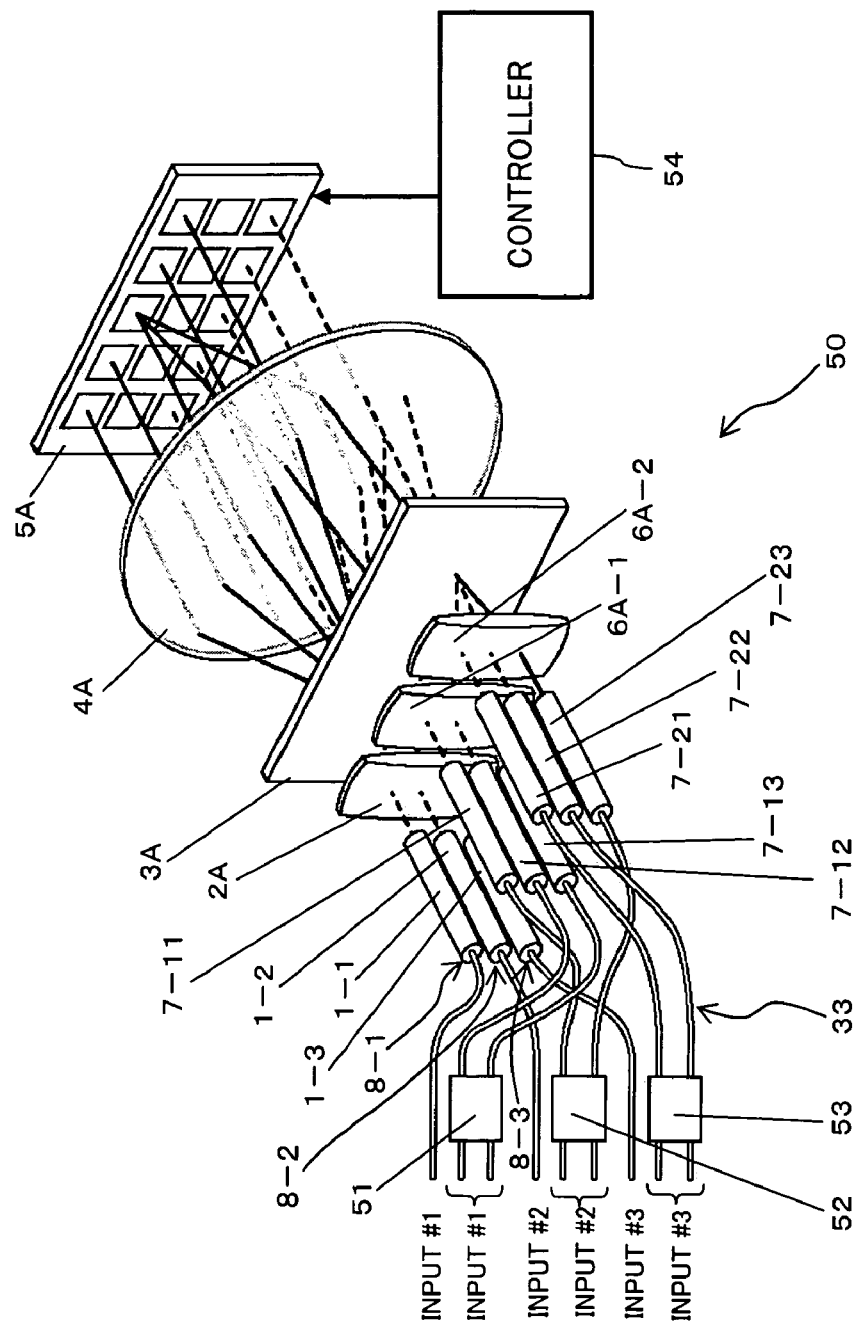
FIG. 17 is a perspective view schematically showing an optical switching device according to a fifth embodiment of the present invention.
Figure 18:
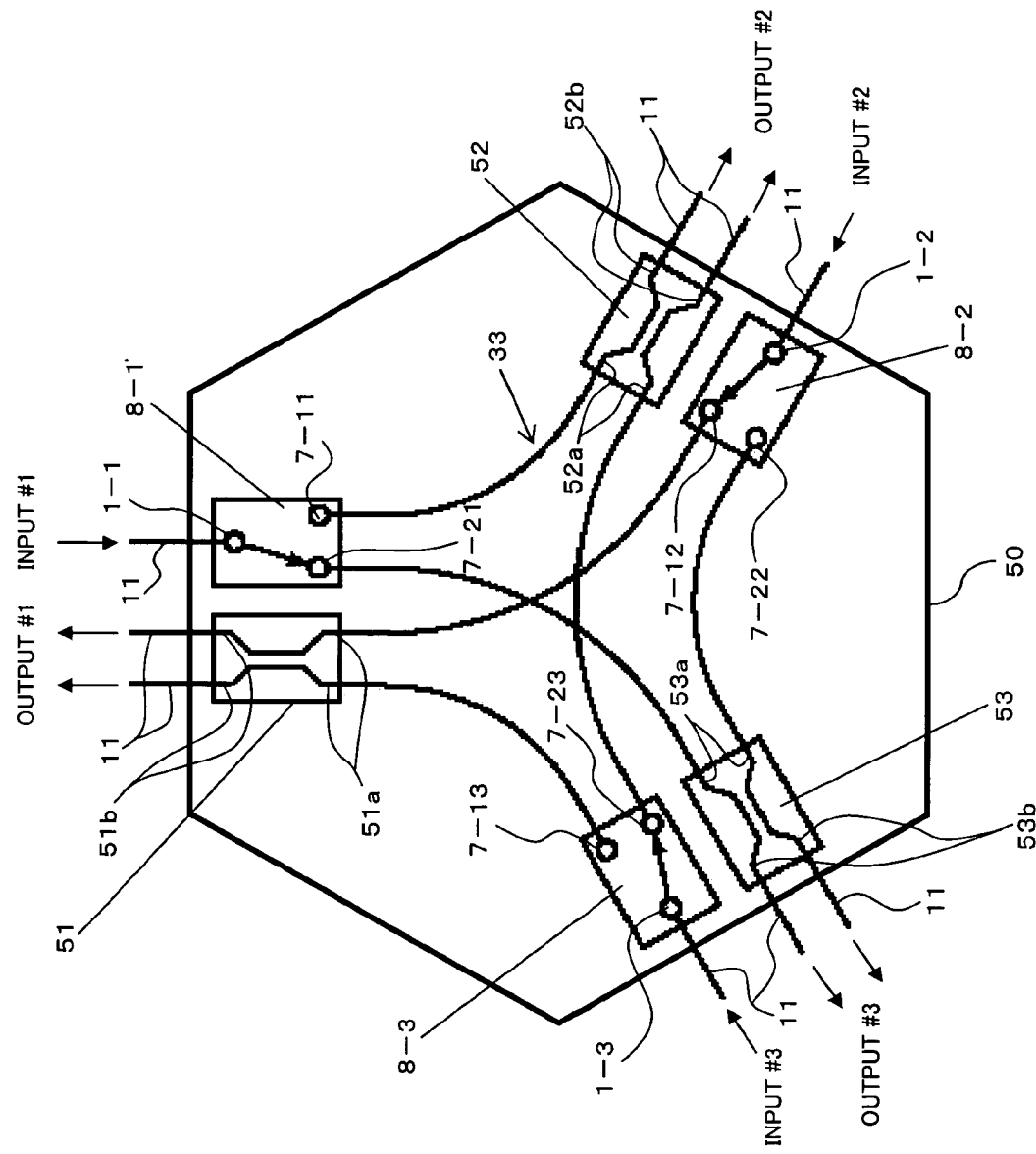
FIG. 18 is a diagram showing an optical switching device according to the fifth embodiment of the present invention.

[E-1] Constitution of Optical Switching Device 60 According to Fifth Embodiment FIG. 17 is a perspective view schematically showing an essential part of an optical switching device 50 according to a fifth embodiment of the present invention. Same as the case of the above-described first embodiment, the optical switching device 50 shown in FIG. 17 comprises three of 1×2 (2×1) wavelength-selective optical switches 8-1 to 8-3 integrally disposed being piled up. The optical switching device 50 further comprises three 3 dB couplers 51-53 as the optical multiplexers and a control device 54, which is capable of individually controlling the inclination angle of the mirrors 5a (refer to FIG. 4) constituting the reflectors 5-1 to 5-3, so as to operate as a 3×3 wavelength-selective optical switch as shown in FIG. 18. In FIG. 17 and FIG. 18, the same reference numerals as those in FIG. 1 denote substantially the identical parts.

The optical switching device 50 according to the fifth embodiment is adapted so that the control device 54 individually controls the inclination angle of the mirrors 5a constituting each of the reflectors 5-1 to 5-3; thereby the wavelength-selective optical switches 8-1 to 8-3 operate as a 1×2 wavelength-selective optical switch respectively.

Further, one of the 1-input & 2-output wavelength-selective optical switches 8-1 to 8-3 and one of the 3 dB couplers 51 to 53 are coupled as a pair of switch & optical multiplexer, which is allotted to the respective paths. And an optical connecting element 33, which connects the second ports 7-11, 7-21, 7-12, 7-22, 7-13, 7-23 as the two output ports comprising the 1-input & 2-output wavelength-selective optical switches 8-1 to 8-3 in each pair of the switch & optical multiplexer to the inputs of the two 3 dB couplers 51 to 53 in the other pairs other than the own pair.

That is, the first ports 1-1 to 1-3 of the wavelength-selective optical switches 8-1 to 8-3 are the input ports #1 to #3 of a 3×3 wavelength-selective optical switch, and each of the second ports 7-11 to 7-13 and 7-21 to 7-23 are connected to each of the two input ports 51a to 53a of the 3 dB couplers 51 to 53 via optical connecting elements 33. Owing to this, each of the two output ports 51b to 53b of the 3 dB coupler 53 can be used as the output ports #1 to #3 of a 3×3 wavelength-selective optical switch.

Further, as shown in FIG. 17 or FIG. 18, the second port 7-11 of the 1×2 wavelength-selective optical switch 8-1 is connected to the input port 52a of the 3 dB coupler 52 via the optical connecting element 33; the second port 7-21 is connected to the input port 53a of the 3 dB coupler 53 via the optical connecting element 33. Likewise, the second port 7-12 of the 1×2 wavelength-selective optical switch 8-2 is connected to the input port 51a of the 3 dB coupler 51 via the optical connecting element 33; the second port 7-22 is connected to the input port 53a of the 3 dB coupler 53 via the optical connecting element 33.

Further, the second port 7-13 of the 1×2 wavelength-selective optical switch 8-3 is connected to the input port 51a of the 3 dB coupler 51 via the optical connecting element 33; the second port 7-23 is connected to the input port 52a of the 3 dB coupler 52 via the optical connecting element 33.

By connecting each of the first ports 1-1 to 1-3 of the wavelength-selective optical switches 8-1 to 8-3 to the transmission channel optical fiber 11 as the input port (#1–#3) of the 3×3 wavelength-selective optical switch, and by connecting each of the output ports 51b to 53b of the 3 dB couplers 51 to 53 to transmission channel optical fiber 11 as the output ports (#1 to #3) of the 3×3 wavelength-selective optical switch, a relay & switching device for optical communication capable of switching the WDM light inputted from the three paths to the output path in three paths based on the wavelength is formed.

[E-2] Operation and Effect of the Optical Switching Device 50 According to the Fifth Embodiment Owing to the above-described constitution, in the optical switching device 50 according to the fifth embodiment, the control device 54 controls the inclination angle of the mirrors 5a constituting the MEMS mirror array 5 individually from each other; thereby the optical switching device 50 operates as the 3×3 wavelength-selective optical switch having three input ports #1 to #3 and three output ports #1 to #3. That is, the light inputted to the first ports 1-1 to 1-3 of the wavelength-selective optical switches 8-1 to 8-3 can be outputted through the output port 53b of the 3 dB couplers 51 to 53 being individually switched over based on the wavelength.

In the optical switching device 50, the light switched over based on the wavelength can be outputted through the output ports given with a serial number (number with #) other than the serial number of the port from which the light is inputted. For example, the light inputted to the first port 1-1 (input port #1) of the wavelength-selective optical switch 8-1 is outputted from either one of the output port 52b (output port #2) of the 3 dB coupler 52 and the output port 53b (output port #3) of the 3 dB coupler 53.

As described above, in the optical switching device 50 according to the fifth embodiment of the present invention, three of the 1×2 (2×1) wavelength-selective optical switches 8-1 to 8-3 are integrally disposed being piled up. Thereby, in addition to the advantage same as that in the case of the above-described first embodiment, such an advantage that the size of the device as the 3×3 wavelength-selective optical switch can be largely reduced is obtained.

Figure 24:
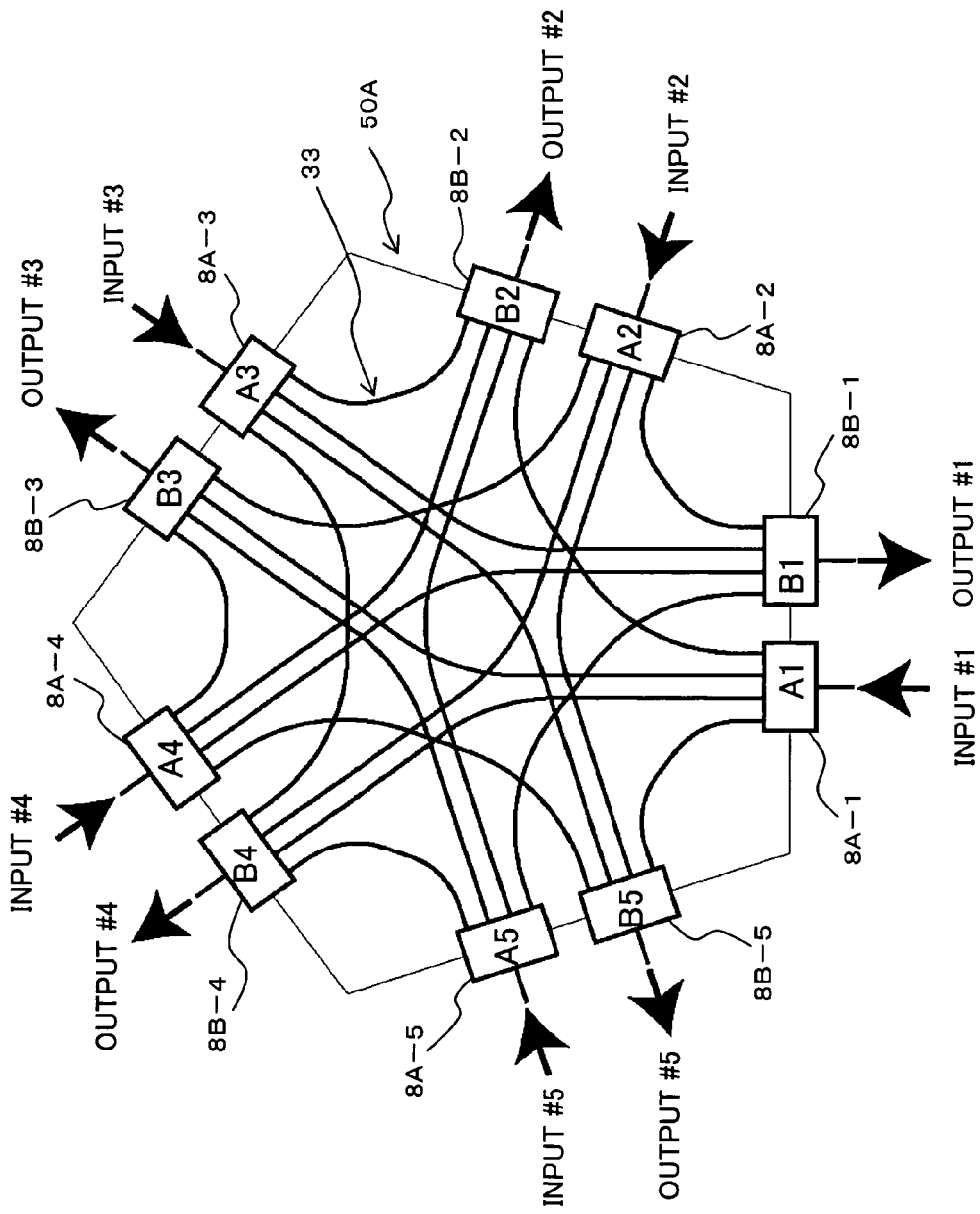
FIG. 24 is a diagram showing an optical switching device according to a modification of the fifth embodiment of the present invention.

In the optical switching device 50 according to the above-described fifth embodiment, using three of 1×2 wavelength-selective optical switches 8-1 to 8-3 and three of 3 dB couplers (same as the 2 input & 1 output optical multiplexer) 51 to 53, the 3×3 wavelength-selective optical switch 50 is formed. However, the present invention is not limited to the above. For example, as shown in FIG. 24, by combining M of 1×N wavelength-selective optical switches 8A-1 to 8A-M, (N=M−1, N is 2 or more) and M of N-input & 1-output optical multiplexers (referred to as N×1 coupler) 8B-1 to 8B-M, an optical switching device 50A as an M×M wavelength-selective optical switch can be formed (FIG. 24 shows an example of N=4 and M=5).

In this case, the optical switching device 50A is structured as described below. That is, M of 1×N optical switches 8A-1 to 8A-M are integrally disposed being piled up, and M of N×1 couplers 8B-1 to 8B-M are provided, and a pair of switch & coupler is formed of one of the 1×N switches 8A-1 (8A-2 to 8A-M) and one of the N×1 couplers 8B-1 (8B-2 to 8B-M); and an optical connecting element 33, which connects N ports of the 1×N switches 8A-u (u is a number from 1 to M) constituting a specific pair of switch & coupler to an input port (any one of N ports) of the N×1 couplers 8B-v (v is a number from 1 to M other than u) included in every pair of switch & coupler other than the switch & coupler of own specific pair, is provided. Here, one port from each of the switches 8A-v selected from the different N of 1×N optical switches 8A-v is connected to the input ports of the N×1 couplers 8B-u.

[F] Description of Sixth Embodiment

[F-1] Constitution of Optical Switching Device 60 According to Sixth Embodiment

Figure 19:
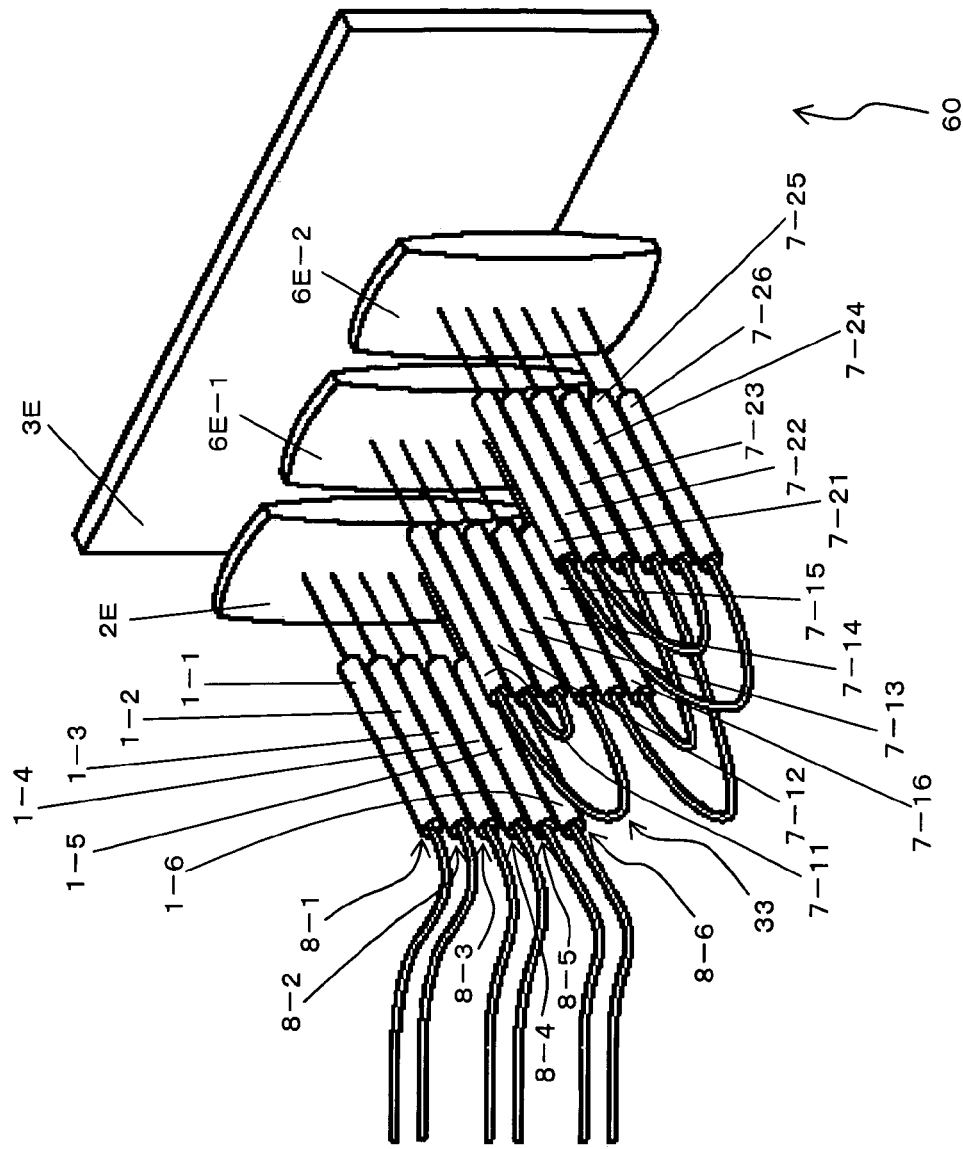
FIG. 19 is a perspective view schematically showing an optical switching device according to a sixth embodiment of the present invention.

FIG. 19 is a perspective view schematically showing an essential part of an optical switching device 60 according to a sixth embodiment of the present invention. Same as the case of the above-described fifth embodiment, the optical switching device 60 shown in FIG. 19 forms a 3×3 wavelength-selective optical switch. However, the point that six of 1×2 (2×1) wavelength-selective optical switches 8-1 to 8-6 are integrally disposed being piled up is different from the case of the above described fifth embodiment.

In the optical switching device 60 shown in FIG. 19, only the first ports 1-1 to 1-6, the second ports 7-11 to 7-16 and 7-21 to 7-26, the second convex lens 2F, the spectroscopy section 3F and the third convex lenses 6E-1 and 6E-2 are shown. Same as the case of the above-described fifth embodiment, the optical switching device 60 also comprises a second convex lens as the second light control element, an MFMS mirror array as the reflector and a control device for controlling the inclination angle of each of the mirrors constituting the MEMS mirror array.

That is, six of first ports 1-1 to 1-6 are arranged vertically; and the second ports 7-11 to 7-16 and the second ports 7-21 to 7-26 are also arranged vertically. That is, corresponding to the ports in one 1×2 (2×1) wavelength-selective optical switch (for example, wavelength-selective optical switch 8-1) are laterally disposed first port (for example, first port 1-1) and the second ports (for example, second port 7-11 and 7-21) in each column.

Figure 20:
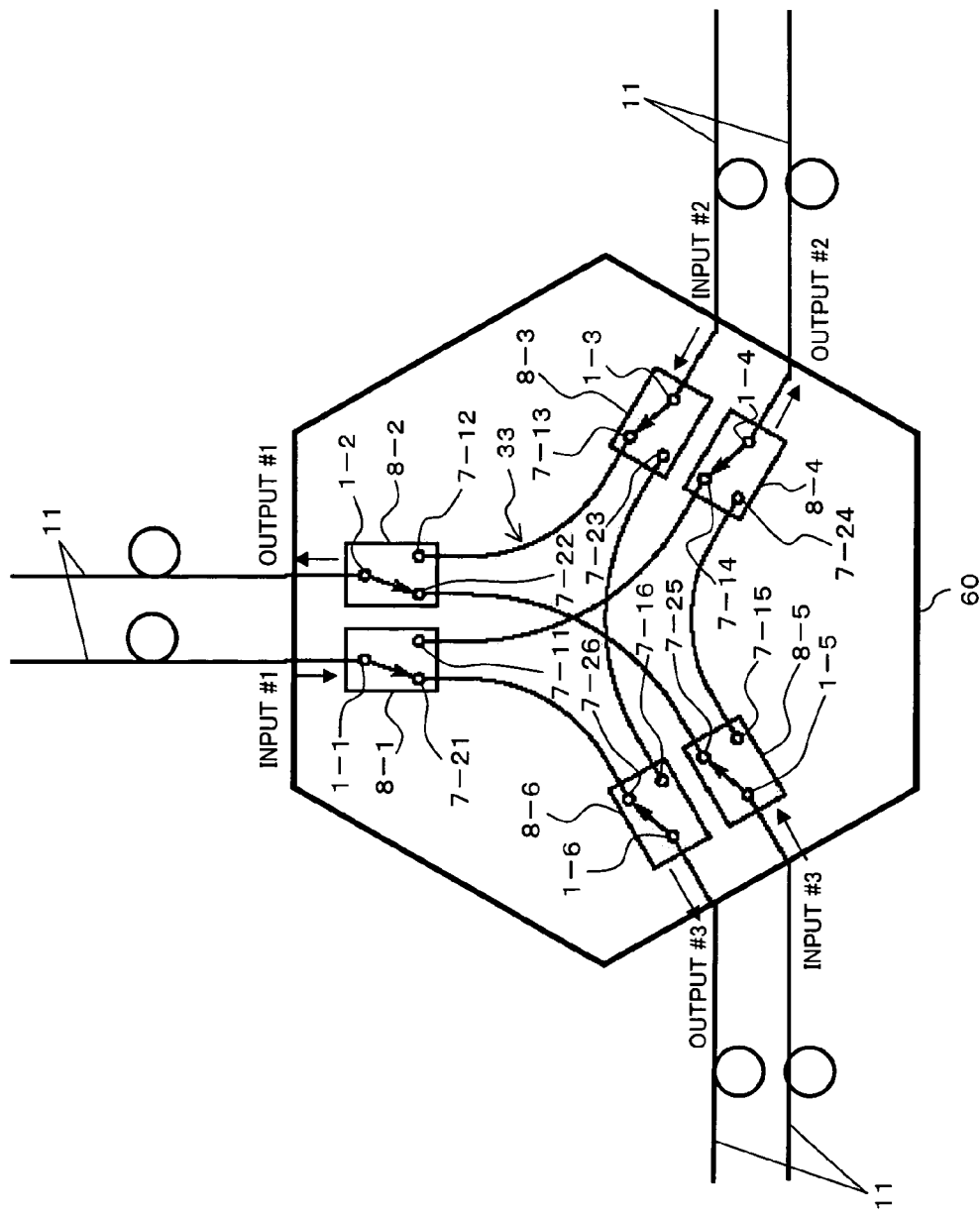
FIG. 20 is a diagram showing an optical switching device according to the sixth embodiment of the present invention.

By connecting the second ports 7-11 to 7-16 and 7-21 to 7-26 of the wavelength-selective optical switches 8-1 to 8-6 via optical fibers 33 as the optical connecting elements, the optical switching device 60 according to the sixth embodiment is formed as a 3×3 wavelength-selective optical switch as shown in FIG. 20.

Each of the second ports 7-11 to 7-16 and 7-21 to 7-26 are connected to each other so that the wavelength-selective optical switch 8-1, 8-3, 8-5 shown in FIG. 19 operate as a 1×2 wavelength-selective optical switch; and the wavelength-selective optical switch 8-2, 8-4, 8-6 operate as a 2×1 wavelength-selective optical switch.

That is, one of the 1-input & 2-output wavelength-selective optical switches 8-1, 8-3 and 8-5, one of the 2-input & 1-output wavelength-selective optical switch 8-2, 8-4 and 8-6 are coupled as a pair; and 2×3 optical switches are coupled to three pairs of switches corresponding to the number of the input/output paths of the 3×3 wavelength-selective optical switches; and an optical connecting element 33, which connects two second ports as the output ports constituting the 1-input & 2-output wavelength-selective optical switch in the switching section in each of the three pairs to the second ports as the input ports of the 2-input & 1-output wavelength-selective switches of the other pairs of switches, is provided.

In particular, the second port 7-11 of the 1×2 wavelength-selective optical switch 8-1 is connected to the second port 7-14 of the 2×1 wavelength-selective optical switch 8-4 via the optical connecting element 33; and the second port 7-21 is connected to the second port 7-26 of the 2×1 wavelength-selective optical switch 8-6 via the optical connecting element 33.

Further, the second port 7-13 of the 1×2 wavelength-selective optical switch 8-3 is connected to the second port 7-12 of the 2×1 wavelength-selective optical switch 8-2 via the optical connecting element 33; and the second port 7-23 is connected to the second port 7-16 of the 2×1 wavelength-selective optical switch 8-6 via the optical connecting element 33.

Further, the second port 7-15 of the 1×2 wavelength-selective optical switch 8-5 is connected to the second port 7-24 of the 2×1 wavelength-selective optical switch 8-4 via the optical connecting element 33; and the second port 7-25 is connected to the second port 7-22 of the 2×1 wavelength-selective optical switch 8-2 via the optical connecting element 33.

Owing to this, as shown in FIG. 20, the first port 1-1 of the wavelength-selective optical switch 8-1 is adapted so as to operate as the input port (input #1) of the 3×3 wavelength-selective optical switch; and the first port 1-2 of the wavelength-selective optical switch 8-2 is adapted so as to operate as the output port (output #1) of the 3×3 wavelength-selective optical switch.

Likewise, the first port 1-3 of the wavelength-selective optical switch 8-3 is adapted to operate as the input port (input #2) of the 3×3 wavelength-selective optical switch; the first port 1-4 of the wavelength-selective optical switch 8-4 is adapted so as to operate as the output port (output #2) of the 3×3 wavelength-selective optical switch; the first port 1-5 of the wavelength-selective optical switch 8-5 is adapted so as to operate as the input port (input #3) of the 3×3 wavelength-selective optical switch; and the first port 1-6 of the wavelength-selective optical switch 8-6 is adapted so as to operate as the output port (output #3) of the 3×3 wavelength-selective optical switch.

In the above-described optical switching device 60 also, the first ports 1-1, 1-3 and 1-5 of the wavelength-selective optical switches 8-1, 8-3 and 8-5 are connected to the transmission channel optical fibers 11 respectively as the input ports (#1–#3) of the 3×3 wavelength-selective optical switches; and the first ports 1-2, 1-4 and 1-6 of the wavelength-selective optical switches 8-2, 8-4 and 8-6 are connected to the transmission channel optical fiber 11 as the output ports (#1–#3) of the 3×3 wavelength-selective optical switches. Thereby, a relay & switching device for optical communication capable of switching the WDM light inputted from three paths to the output path in three paths based on the wavelength.

[F-2] Operation and Effect of the Optical Switching Device 60 According to the Sixth Embodiment With the above-described constitution, by individually controlling the inclination angle of the mirror constituting the MEMS mirror array by a control device (not shown), the optical switching device 60 according to the sixth embodiment can be operated as the 3×3 wavelength-selective optical switch, which is provided with three input ports #1–#3 and three output ports #1–#3. That is, the light beams, which are inputted to the first ports 1-1, 1-3 and 1-5 of the wavelength-selective optical switches 8-1, 8-3 and 8-5 can be switched over individually based on the wavelength and outputted through the first ports 1-2, 1-4 and 1-6 of the wavelength-selective optical switches 8-2, 8-4 and 8-6.

In the optical switching device 60 also, the light beams, which are switched over based on the wavelength can be outputted through the output ports given with a number other than the serial number of the port to which the light is inputted. For example, the light, which is inputted to the first port 1-1 (input port #1) of the wavelength-selective optical switch 8-1, is outputted from either one of the first port 1-4 (output port #2) of the wavelength-selective optical switch 8-4 and the first port 1-6 (output port #3) of the wavelength-selective optical switch 8-6.

As described above, in the optical switching device 60 according to the sixth embodiment of the present invention, six of the 1×2 (2×1) wavelength-selective optical switches 8-1 to 8-6 are integrally disposed being piled up. Thereby, in addition to the advantage same as that in the case of the above-described first embodiment, such an advantage that the size of the device as the 3×3 wavelength-selective optical switch can be largely reduced is obtained.

Figure 25:
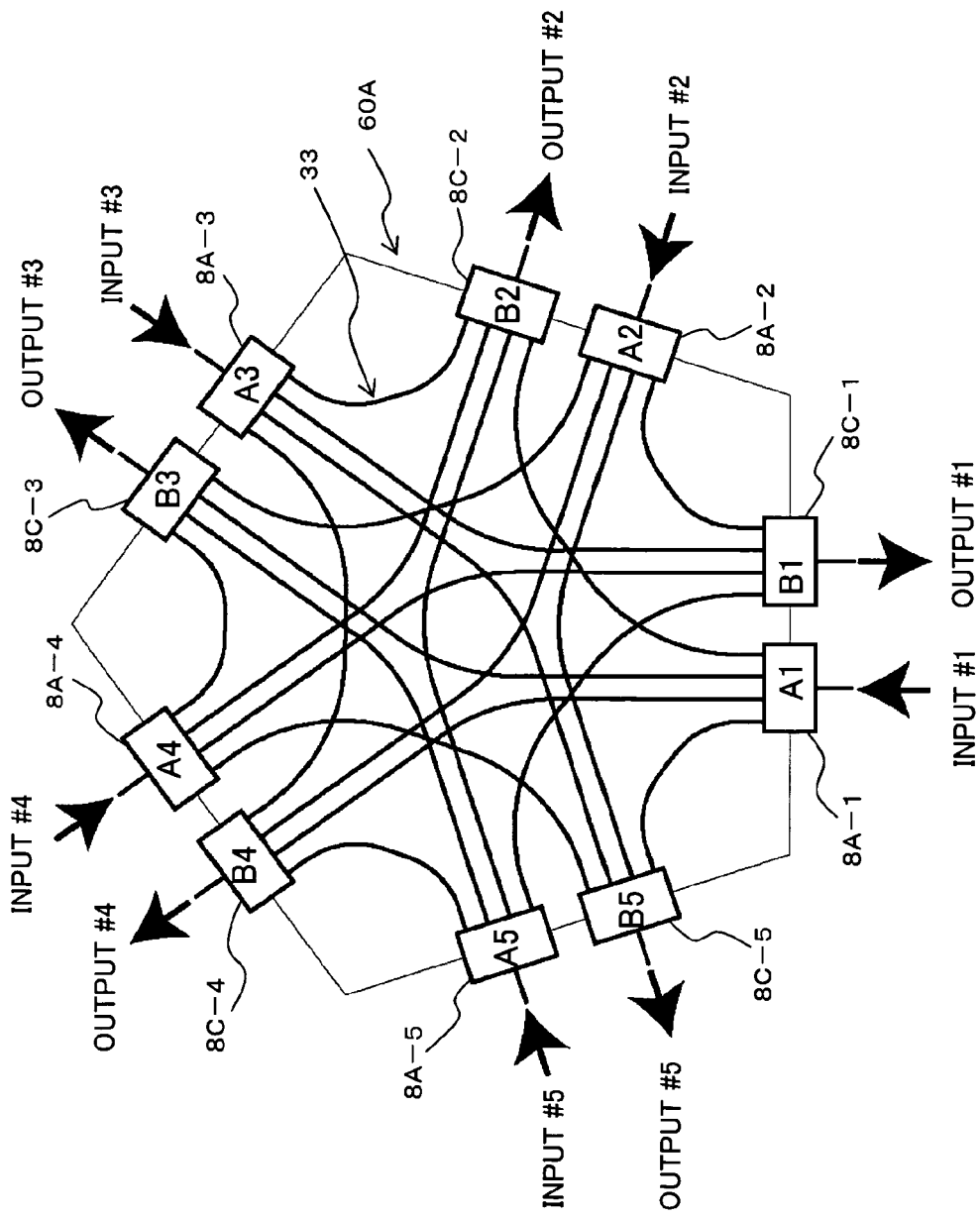
FIG. 25 is a diagram showing an optical switching device according to the modification of the sixth embodiment of the present invention.

In the above-described optical switching device 60 according to the sixth embodiment, the 3×3 wavelength-selective switch is constituted of three of 1×2 wavelength-selective switches and three of N×1 wavelength-selective switch. However, the present invention is not limited to the above. For example, as shown in FIG. 25, by combining M of 1×N wavelength-selective switches 8A-1 to 8A-M (N=M−1, N is 2 or more) and M of N×1 wavelength-selective switches 8C-1 to 8C-M, an optical switching device 60A as an M×M wavelength-selective optical switch can be formed (FIG. 25 shows an example of N=4 and M=5).

In this case, the optical switching device 60A is structured as described below. That is, 2M of 1×N (N×1) optical switches A-1 to 8A-M and 8C-1 to 8C-M are integrally disposed being piled up; and one of the 1×N switches 8A-1 (8A-2 to 8A-M) and one of the N×1 switches 8C-1 (8C-2 to 8C-M) are coupled as a pair of switches; and an optical connecting elements 33 comprised of an optical fiber for connecting N ports of the 1×N switches 8A-u (u is a number from 1–M) constituting a specific pair of switch to one of the N ports in the N×1 switches 8C-v (v is a number from 1 to M other than u) included in every pair of switch other than the own specific pair. Here, the input port of the N×1 optical switch 8C-u is connected to one port of each of the switches 8A-v, which is selected from the different N of 1×N optical switches 8A-v.

[G] Others

According to the present invention, irrespective of the above-described embodiments, it is possible to carry out the present invention in a various modifications within a range of the spirit thereof.

For instance, in the above-described embodiments, as the wavelength-selective optical switch, which is a unit to be integrally disposed being piled up into a plural columns, 1×2 (2×1) wavelength-selective optical switch, which has, as the ports, one first port and two second ports, is employed. However, according to the present invention, a plurality of 1×N (N×1) wavelength-selective optical switches, which have N equal to three or more second ports may be disposed being piled up to plural columns.

Further, in the above-described embodiments, as the number of columns to be integrally piled up, a case of 3 columns in the first, second and fifth embodiments; a case of 2 columns in the third and fourth embodiment; and a case of 6 columns in the sixth embodiment have been described. However, according to the present invention, if the number of the columns is at least plural number, the 1×N wavelength-selective optical switches of the number of columns other than the above numbers may be integrally disposed being piled up. In such case also, same as the case of the first embodiment, the number of parts for the first and third convex lenses and the size of the spectroscopy section can be reduced.

Further, in the 1×N wavelength-selective optical switch in the above-described embodiments, which is a unit to be integrally disposed being piled up, it is adapted so that the light, which is switched over based on the wavelength, is outputted through a output port given with a number other than the serial number of the port to which the light is inputted. However, according to the present invention, when an element such as optical circulator or the like, which is capable of switching over the output path depending on the incident direction of the light, is interposed between the first port and the transmission fiber 11, it is possible to adapt so that the light is outputted through the output port, which has the same serial number as the serial number of the input port to which the light is inputted. When an M×M wavelength-selective switch like the fifth and six embodiments is formed by using the 1×N wavelength-selective optical switch as described above, same as the above-described case shown in FIG. 22, an M×M wavelength wavelength-selective optical switch capable of selecting a path, which returns the signals to the port from which the signals are transmitted, can be formed.

Figure 26:
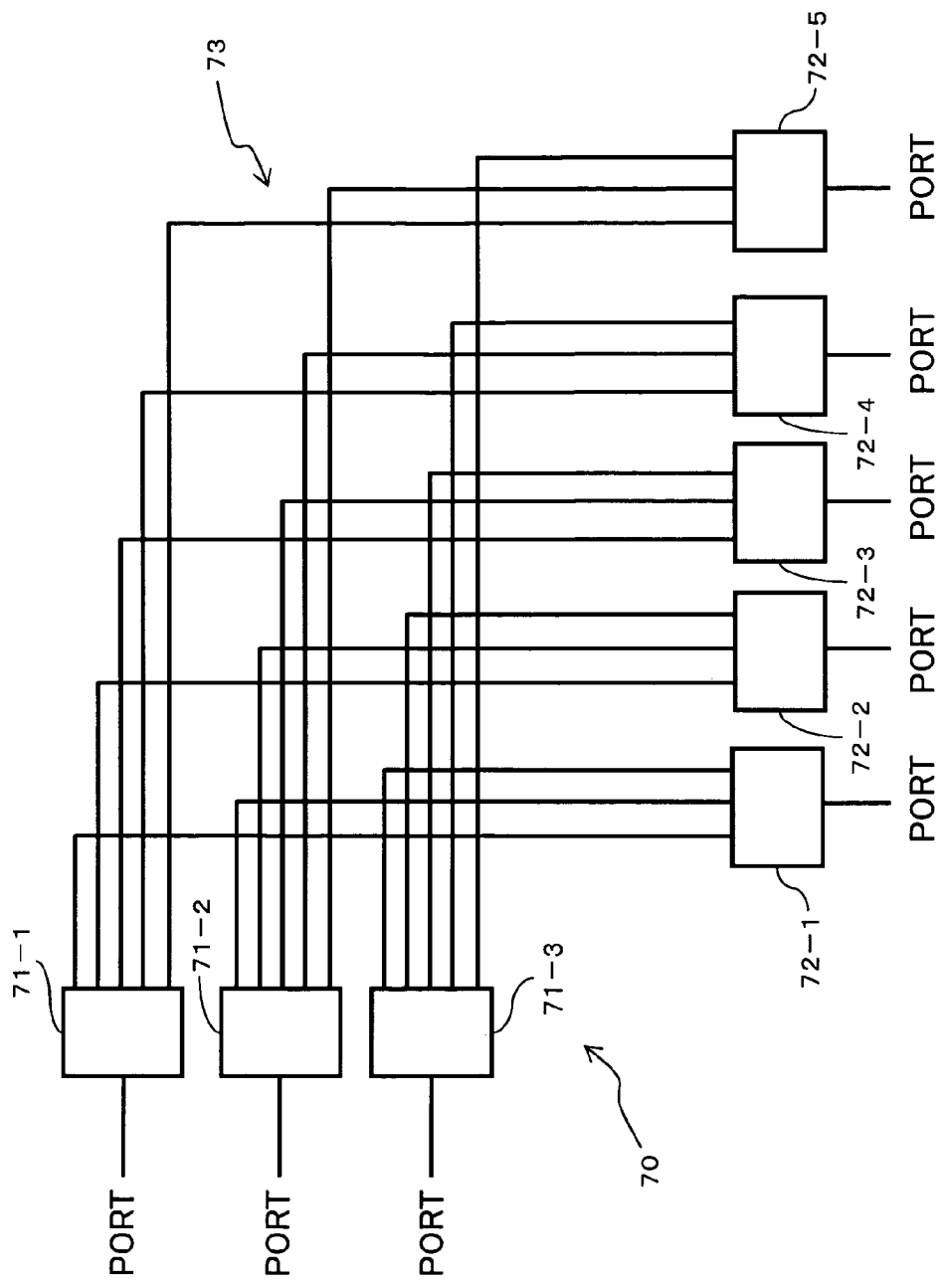
FIG. 26 is a diagram showing an example of the structure of an N×M optical switch.

Further, as shown in FIG. 26, when the present invention is used to manufacture an optical switching device 70 (FIG. 2 shows an example of N=3 and M=5) capable of operating as an N×M wavelength-selective optical switch, which has N of 1×M optical switches 71-1 to 71-N, M of N×1 optical switches 72-1 to 72-M and N×M of optical connecting elements 73 for connecting M ports of the 1×M optical switches 71-1 to 71-N and N ports of the N×1 optical switches 72-1 to 72-M, for example, N of 1×M wavelength-selective optical switches can be integrated compactly, and further, M of N×1 wavelength-selective optical switches can be compactly piled up; and accordingly, the N×M wavelength-selective switch can be formed compactly.

Further, the device of the present invention can be manufactured based on the above-disclosed embodiments.

What is claimed is:

1. An optical switching device, comprising:
   a plurality of optical switches, in which each of said optical switches has a first port;
   N (N is a plural number) of second ports, which are capable of being optically connected to the first port, being disposed in parallel with said first port;
   a spectroscopy section capable of refracting a light beam, which is outputted from said first port or second ports, in the different directions depending on the wavelength as well as in the direction in which said first port and second ports are disposed; and
   a reflector capable of reflecting the light beams, which are refracted by the spectroscopy section in the different directions depending on the wavelength, in the reflection directions preset based on the wavelength, wherein
   each of said optical switches are adapted so that the reflected beams having said wavelength, which are reflected by the reflector, are inputted to the first or second ports disposed at a position corresponding to the reflection direction, and disposed integrally being piled up to plural layers, in which
   the optical switching device is formed so that said optical switches share the spectroscopy section with each other,
   the optical switching device further includes
   a first light control element that is formed integrally on the paths of a plurality of light beams, which are outputted from each of the first ports in each of said optical switches and propagate in space, and is capable of converting the plurality of light beams outputted from the first ports of said optical switches into collimated light beams to output the collimated light beams to relatively and substantially the same point on the spectroscopy section;
   a second light control element that is capable of condensing the light, which has the same wavelength in the light outputted from the first port or the second ports constituting a specific optical switch in said piled up optical switches and separated, to a point; and
   a third light control element that is, assuming that i is a positive integer number equal to N or less and the i-th column in the N of second ports of said plurality of optical switches disposed being piled up to plural layers is the second ports in the i-th set, formed integrally on the paths of the plurality of light beams, which are outputted from the second ports in the i-th set and propagate in space, and capable of converting the light beams outputted from the second ports of the plurality of optical switches into a plurality of collimated light beams to output the collimated light beams to substantially the same point in the spectroscopy section.

2. The optical switching device according to claim 1, wherein each of said first light control element, second light control element and third light control element is constituted of a convex lens respectively, and the spectroscopy section is constituted of a diffraction grating in the shape of a parallel plate.

3. The optical switching device according to claim 2, wherein the diffraction grating in the shape of a parallel plate constituting the spectroscopy section is a transmissive diffraction grating in the shape of a parallel plate.

4. The optical switching device according to claim 2, wherein the diffraction grating in the shape of a parallel plate constituting the spectroscopy section is a reflective diffraction grating in the shape of a parallel plate.

5. The optical switching device according to claim 2, further comprising: M of N-input optical couplers as well as M (M=N+1) of said optical switches disposed being piled up to layers, wherein M sets of switch & optical couplers, in which M of the optical switches are formed into a 1-input & N-output wavelength-selective optical switch, and one of said 1-input & N-output wavelength-selective optical switch and one of the N-input & at least 1-output optical coupler are formed as a set, and an optical connecting element that connects N of inputs of said N-input & at least 1-output optical coupler, which are included in a specific set of switch & optical multiplexer, to N of second ports, which are obtained by selecting each one of second port from one optical switch in N of optical switches included in N sets of switch & optical coupler other than the specific set of the switch & optical coupler, in a one-to-one manner respectively.

6. The optical switching device according to claim 2, wherein the optical switching device is provided with 2×M (M=N+1) of the optical switches disposed being piled up to layers, the 2×M of the optical switches are arranged to M of switch sets, which are constituted of one of said 1-input & N-output wavelength-selective optical switch and one of said N-input & 1-output wavelength-selective optical switch as a set, and an optical connecting element, which connects N of inputs of said N-input & 1-output wavelength-selective optical switch, which are included in a specific switch set, to N of second ports, which are obtained by selecting each of one second port from one wavelength-selective optical switch in N of 1-input & N-output wavelength-selective optical switches included in N of switch sets other than the specific switch set in a one-to-one manner respectively.

7. The optical switching device according to claim 1, wherein each of said optical switches as the unit to be disposed being piled up is structured so that said first port is the input port and said plurality of second ports are the output ports, thereby a 1-input & N-output wavelength-selective optical switch, which is capable of outputting the light beams inputted from the first port via the second ports arranged as the targets of output based on the wavelength, is formed; and is structured so that said first port is the output port and said N of second ports are the input ports, thereby an N-input & 1-output wavelength-selective optical switch, which is capable of selectively outputting the light beam inputted from the N of second ports through the first port based on the wavelength, is formed.

8. The optical switching device according to claim 1, wherein the first to third light control elements are arranged so that a plurality of light beams, which are outputted from the plurality of first ports or inputted to the plurality of first ports constituting said plurality of optical switches deposed being piled up, pass through substantially the same point in the spectroscopy section; as well as so that, assuming that i is a positive integer number equal to N or less, the plurality of light beams, which are inputted to the second ports in the i-th set or outputted from the second ports in the i-th set in said N sets of second ports constituting said plurality of optical switches disposed being piled up, pass through substantially the same point in the spectroscopy section.

9. The optical switching device according to claim 1, further comprising at least one first PSD (physical status dependent) light beam separating/combining section that, being optically connected to the first ports constituting each of said optical switches piled up to plural layers, separates or combines the light beam corresponding to the physical status of the light beam, and a plurality of second PSD light beam separating/combining sections that, being optically connected to the second ports at the respective positions corresponding to the reflection direction by the reflector in the second ports constituting each of said optical switches piled up to plural layers, separate or combine the light beam corresponding to the physical status of the light beam, wherein the optical switching device is arranged so that the light beam separated by the first PSD light beam separating/combining section is outputted to the first light control elements through the first ports different from each other, and the light beam outputted to the second PSD light beam separating/combining sections from the second ports is combined by the second PSD light beam separating/combining sections, and the light beam separated by the second PSD light beam separating/combining sections is outputted to the third light control element through the second ports different from each other, and the light beam outputted to the first PSD light beam separating/combining section from the first ports is combined by the first PSD light beam separating/combining section.

10. The optical switching device according to claim 9, wherein the first and second PSD light beam separating/combining sections are constituted of a optical waveguide device respectively.

11. The optical switching device according to claim 10, wherein the first and second PSD light beamseparating/combining sections are arranged so as to separate/combine the light beam based on the wavelength.

12. The optical switching device according to claim 11, wherein the optical switching device is arranged so that the light beam separated by the first PSD light beam separating/combining section is imparted to said optically connected first ports at predetermined intervals of optical wavelength in order; and the light beam separated by the second PSD light beam separating/combining sections is imparted to said optically connected second ports at predetermined intervals of optical wavelength in order.

13. The optical switching device according to claim 9, wherein the first and second PSD light beam separating/combining sections are arranged so as to separate/combine the light beam based on the wavelength.

14. The optical switching device according to claim 13, wherein the optical switching device is arranged so that the light beam separated by the first PSD light beam separating/combining section is imparted to said optically connected first ports at predetermined intervals of optical wavelength in order; and the light beam separated by the second PSD light beam separating/combining sections is imparted to said optically connected second ports at predetermined intervals of optical wavelength in order.

15. The optical switching device according to claim 9, wherein the first and second PSD light beam separating/combining sections are arranged so as to separate/combine the light beam corresponding to the polarized light component.

* * * * *

UNITED STATES PATENT AND TRADEMARK OFFICE
CERTIFICATE OF CORRECTION

PATENT NO. : 6,978,061 B1  
APPLICATION NO. : 11/033738  
DATED : December 20, 2005  
INVENTOR(S) : Haruhiko Tabuchi Page 1 of 1

It is certified that error appears in the above-identified patent and that said Letters Patent is hereby corrected as shown below:

Title Page, col. 2, line 15, delete "20202" and insert --2002--, therefor.

Col. 30, line 14, delete "deposed" and insert --disposed--, therefor.

Col. 30, line 58, delete "beamseparating" and insert --beam separating--, therefor.

Signed and Sealed this

First Day of August, 2006

JON W. DUDAS  
*Director of the United States Patent and Trademark Office*